(12) United States Patent
Schorr et al.

(10) Patent No.: US 8,442,850 B2
(45) Date of Patent: May 14, 2013

(54) PROVIDING ACCOUNTING SOFTWARE APPLICATION AS ENTERPRISE SERVICES

(75) Inventors: Martin Schorr, Rauenberg (DE); Michael Sylvester, Roemerberg (DE); Georg Dopf, Schwetzingen (DE); Dirk Henrich, Wiesloch (DE); Gunther Liebich, Walldorf (DE); Michael Conrad, Reilingen (DE); Andreas Reccius, Walldorf (DE); Markus Klein, Frankenthal (DE); Michael Hohendorf, Waghaeusel (DE); Andrea Roesinger, Weinheim (DE); Rainer Soltek, Hohensachsen (DE); Juergen Kind, Oestringen (DE); Ralf Dinkel, Wailbstadt-Daisbach (DE); Peter Von Zimmermann, Angelbachtal (DE); Daniel Bock, Heidelberg (DE); Udo Laub, Hambruecken (DE); Thomas Schachner, Heidelberg (DE); Gerald Paetzold, Heidelberg (DE); Kai-Michael Roesner, Eggenstein-Leopoldshafen (DE); Edwin Himmelsbach, Heidelberg (DE); Torsten Bachmann, St. Leon-Rot (DE); Volker Faisst, Ilvesheim (DE); Otfried Von Geisau, Sinsheim (DE); Michael Meyringer, Rauenberg (DE); Ralf Klein, Wiesloch (DE); Dieter Krisch, Karlsruhe (DE)

(73) Assignee: SAP AG, Walldorf (DE)

( * ) Notice: Subject to any disclaimer, the term of this patent is extended or adjusted under 35 U.S.C. 154(b) by 1521 days.

(21) Appl. No.: 11/396,327

(22) Filed: Mar. 30, 2006

(65) Prior Publication Data

US 2007/0233541 A1    Oct. 4, 2007

(51) Int. Cl.
*G06Q 10/00*    (2012.01)
(52) U.S. Cl.
USPC .................. 705/7.12; 705/7.11; 705/30
(58) Field of Classification Search ............ 705/7, 8, 705/7.11, 7.12, 7.3
See application file for complete search history.

(56) References Cited

U.S. PATENT DOCUMENTS

| 4,947,321 A | 8/1990 | Spence et al. |
| 5,361,198 A | 11/1994 | Harmon et al. |

(Continued)

FOREIGN PATENT DOCUMENTS

| WO | WO 00/23874 | 4/2000 |
| WO | WO 2004/083984 | 9/2004 |
| WO | WO 2005/114381 A2 * | 5/2005 |
| WO | WO 2005/114381 | 12/2005 |

OTHER PUBLICATIONS

Intuit Canada Ltd. Startup Guide—QuickBooks Basic for Windows QuickBooks Pro for Windows QuickBooks Premier for Windows. Alberta:Intuit Canada Ltd., 2002, p. 84.*

(Continued)

*Primary Examiner* — Andre Boyce
*Assistant Examiner* — Renae Feacher
(74) *Attorney, Agent, or Firm* — Fish & Richardson P.C.

(57) ABSTRACT

Methods and apparatus, including systems and computer program products, for a services architecture design that provides enterprise services having accounting functionality at the level of an enterprise application. The design includes a set of service operations, process components, and optionally deployment units. Suitable business objects are also described.

2 Claims, 13 Drawing Sheets

U.S. PATENT DOCUMENTS

| | | | |
|---|---|---|---|
| 5,550,734 A | 8/1996 | Tarter et al. | |
| 5,560,005 A | 9/1996 | Hoover et al. | |
| 5,566,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A * | 10/1998 | Noble et al. | 719/316 |
| 5,832,218 A | 11/1998 | Gibbs et al. | |
| 5,848,291 A | 12/1998 | Milne et al. | |
| 5,867,495 A | 2/1999 | Elliott et al. | |
| 5,870,588 A | 2/1999 | Rompaey et al. | |
| 5,881,230 A | 3/1999 | Christensen et al. | |
| 5,893,106 A | 4/1999 | Brobst et al. | |
| 5,898,872 A | 4/1999 | Richley | |
| 5,918,219 A * | 6/1999 | Isherwood | 705/37 |
| 5,987,247 A | 11/1999 | Lau | |
| 5,991,536 A | 11/1999 | Brodsky et al. | |
| H1830 H | 1/2000 | Petrimoulx et al. | |
| 6,028,997 A | 2/2000 | Leymann et al. | |
| 6,038,393 A | 3/2000 | Iyengar et al. | |
| 6,049,838 A | 4/2000 | Miller et al. | |
| 6,067,559 A | 5/2000 | Allard et al. | |
| 6,070,197 A | 5/2000 | Cobb et al. | |
| 6,112,024 A | 8/2000 | Almond et al. | |
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 | 1/2001 | Galdes et al. | |
| 6,182,133 B1 | 1/2001 | Horvitz | |
| 6,192,390 B1 | 2/2001 | Berger et al. | |
| 6,208,345 B1 | 3/2001 | Sheard et al. | |
| 6,237,136 B1 | 5/2001 | Sadahiro | |
| 6,256,773 B1 | 7/2001 | Bowman-Amuah | |
| 6,272,672 B1 | 8/2001 | Conway | |
| 6,289,502 B1 | 9/2001 | Garland et al. | |
| 6,311,170 B1 | 10/2001 | Embrey | |
| 6,338,097 B1 * | 1/2002 | Krenzke et al. | 719/329 |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Costanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,640,238 B1 | 10/2003 | Bowman-Amuah | |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 | 4/2004 | Blossman et al. | |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,757,837 B1 | 6/2004 | Platt et al. | |
| 6,764,009 B2 | 7/2004 | Melick et al. | |
| 6,772,216 B1 * | 8/2004 | Ankireddipally et al. | 709/230 |
| 6,782,536 B2 | 8/2004 | Moore et al. | |
| 6,789,252 B1 | 9/2004 | Burke et al. | |
| 6,845,499 B2 | 1/2005 | Srivastava et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,898,783 B1 | 5/2005 | Gupta et al. | |
| 6,904,399 B2 | 6/2005 | Cooper et al. | |
| 6,907,395 B1 | 6/2005 | Hunt et al. | |
| 6,950,802 B1 * | 9/2005 | Barnes et al. | 705/7.22 |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 | 5/2006 | Discenzo | |
| 7,051,071 B2 | 5/2006 | Stewart et al. | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 | 7/2006 | Godlewski et al. | |
| 7,076,762 B2 | 7/2006 | Fisher | |
| 7,076,766 B2 | 7/2006 | Wirts et al. | |
| 7,100,195 B1 | 8/2006 | Underwood | |
| 7,103,873 B2 | 9/2006 | Tanner et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,131,069 B1 * | 10/2006 | Rush et al. | 715/738 |
| 7,149,887 B2 | 12/2006 | Morrison et al. | |
| 7,155,403 B2 | 12/2006 | Cirulli et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,213,232 B1 | 5/2007 | Knowles | |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,280,955 B2 | 10/2007 | Martin | |
| 7,283,973 B1 | 10/2007 | Loghmani et al. | |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,322,024 B2 | 1/2008 | Carlson et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,401,334 B2 | 7/2008 | Fussell | |
| 7,406,716 B2 | 7/2008 | Kanamori et al. | |
| 7,415,697 B1 | 8/2008 | Houlding | |
| 7,418,409 B1 | 8/2008 | Goel | |
| 7,418,424 B2 | 8/2008 | Martin et al. | |
| 7,424,701 B2 | 9/2008 | Kendall et al. | |
| 7,433,979 B2 | 10/2008 | Need | |
| 7,448,022 B1 | 11/2008 | Ram et al. | |
| 7,451,432 B2 | 11/2008 | Shukla et al. | |
| 7,460,654 B1 | 12/2008 | Jenkins et al. | |
| 7,461,030 B2 | 12/2008 | Hibler et al. | |
| 7,469,233 B2 | 12/2008 | Shooks et al. | |
| 7,493,594 B2 | 2/2009 | Shenfield et al. | |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,574,694 B2 | 8/2009 | Mangan et al. | |
| 7,624,371 B2 | 11/2009 | Kulkarni et al. | |

| | | | | | | |
|---|---|---|---|---|---|---|
| 7,631,291 B2 | 12/2009 | Shukla et al. | | 2003/0130860 A1 | 7/2003 | Datta et al. |
| 7,640,195 B2 | 12/2009 | Von Zimmermann et al. | | 2003/0182206 A1 | 9/2003 | Hendrix et al. |
| 7,640,291 B2 | 12/2009 | Maturana et al. | | 2003/0212602 A1 | 11/2003 | Schaller |
| 7,644,390 B2 | 1/2010 | Khodabandehloo et al. | | 2003/0233290 A1 | 12/2003 | Yang et al. |
| 7,653,898 B1 | 1/2010 | Ali et al. | | 2004/0015367 A1 | 1/2004 | Nicastro et al. |
| 7,657,406 B2 | 2/2010 | Tolone et al. | | 2004/0034578 A1 | 2/2004 | Oney et al. |
| 7,657,445 B1 | 2/2010 | Goux | | 2004/0054564 A1 | 3/2004 | Fonseca et al. |
| 7,665,083 B2 | 2/2010 | Demant et al. | | 2004/0093268 A1 | 5/2004 | Ramchandani et al. |
| 7,668,761 B2 | 2/2010 | Jenkins et al. | | 2004/0093381 A1 | 5/2004 | Hodges et al. |
| 7,672,888 B2 * | 3/2010 | Allin et al. .................. 705/35 | | 2004/0111304 A1 | 6/2004 | Meka et al. |
| 7,676,786 B2 | 3/2010 | Shenfield et al. | | 2004/0111639 A1 | 6/2004 | Schwartz et al. |
| 7,681,176 B2 | 3/2010 | Wills et al. | | 2004/0128180 A1 * | 7/2004 | Abel et al. .................. 705/9 |
| 7,693,586 B2 | 4/2010 | Dumas et al. | | 2004/0133481 A1 * | 7/2004 | Schwarze et al. ........... 705/26 |
| 7,703,073 B2 | 4/2010 | Illowsky et al. | | 2004/0153359 A1 | 8/2004 | Ho et al. |
| 7,739,160 B1 | 6/2010 | Ryan et al. | | 2004/0158506 A1 | 8/2004 | Wille |
| 7,742,985 B1 | 6/2010 | Digrigoli et al. | | 2004/0172510 A1 | 9/2004 | Nagashima et al. |
| 7,747,980 B2 | 6/2010 | Illowsky et al. | | 2004/0177342 A1 | 9/2004 | Worley, Jr. |
| 7,765,156 B2 | 7/2010 | Staniar et al. | | 2004/0181470 A1 | 9/2004 | Grounds |
| 7,765,521 B2 | 7/2010 | Bryant | | 2004/0181538 A1 | 9/2004 | Lo et al. |
| 7,784,025 B2 | 8/2010 | Challapalli et al. | | 2004/0205011 A1 | 10/2004 | Northington et al. |
| 7,788,145 B2 | 8/2010 | Wadawadigi et al. | | 2004/0236639 A1 | 11/2004 | Candadai et al. |
| 7,788,319 B2 | 8/2010 | Schmidt | | 2004/0236687 A1 | 11/2004 | Tyson-Quah |
| 7,793,256 B2 | 9/2010 | Charisius et al. | | 2004/0243489 A1 | 12/2004 | Mitchell et al. |
| 7,793,258 B2 | 9/2010 | Sundararajan et al. | | 2004/0254866 A1 | 12/2004 | Crumbach et al. |
| 7,797,698 B2 | 9/2010 | Diament et al. | | 2004/0255152 A1 | 12/2004 | Kanamori et al. |
| 7,805,365 B1 | 9/2010 | Slavin et al. | | 2005/0010501 A1 | 1/2005 | Ward, Jr. |
| 7,814,142 B2 | 10/2010 | Mamou et al. | | 2005/0022160 A1 | 1/2005 | Uluakar et al. |
| 7,822,682 B2 | 10/2010 | Arnold et al. | | 2005/0033588 A1 | 2/2005 | Ruiz et al. |
| 7,835,971 B2 | 11/2010 | Stockton et al. | | 2005/0044015 A1 | 2/2005 | Bracken et al. |
| 7,886,041 B2 | 2/2011 | Outhred et al. | | 2005/0060235 A1 | 3/2005 | Byrne |
| 7,895,568 B1 | 2/2011 | Goodwin et al. | | 2005/0060408 A1 | 3/2005 | McIntyre et al. |
| 7,904,350 B2 | 3/2011 | Ayala et al. | | 2005/0065828 A1 | 3/2005 | Kroswek et al. |
| 7,912,755 B2 | 3/2011 | Perry et al. | | 2005/0108680 A1 | 5/2005 | Cheng et al. |
| 7,917,889 B2 | 3/2011 | Devarakonda et al. | | 2005/0113092 A1 | 5/2005 | Coppinger et al. |
| 7,925,985 B2 | 4/2011 | Moore | | 2005/0114829 A1 | 5/2005 | Robin et al. |
| 8,001,519 B2 | 8/2011 | Conallen et al. | | 2005/0125310 A1 | 6/2005 | Hazi et al. |
| 8,006,224 B2 | 8/2011 | Bateman et al. | | 2005/0144125 A1 | 6/2005 | Erbey et al. |
| 8,010,938 B2 | 8/2011 | Elaasar | | 2005/0144226 A1 | 6/2005 | Purewal |
| 8,051,332 B2 | 11/2011 | Zakonov et al. | | 2005/0156500 A1 * | 7/2005 | Birecki et al. .............. 313/310 |
| 8,078,485 B1 | 12/2011 | Kraehmueller et al. | | 2005/0160104 A1 | 7/2005 | Meera et al. |
| 8,086,995 B2 | 12/2011 | Luo et al. | | 2005/0165784 A1 | 7/2005 | Gomez et al. |
| 8,091,065 B2 | 1/2012 | Mir et al. | | 2005/0177435 A1 | 8/2005 | Lidow |
| 8,112,738 B2 | 2/2012 | Pohl et al. | | 2005/0203760 A1 * | 9/2005 | Gottumukkala et al. ......... 705/1 |
| 8,140,455 B2 | 3/2012 | Hutson et al. | | 2005/0203813 A1 | 9/2005 | Welter et al. |
| 2001/0052108 A1 | 12/2001 | Bowman-Amuah | | 2005/0209732 A1 | 9/2005 | Audimoolam et al. |
| 2002/0026394 A1 | 2/2002 | Savage et al. | | 2005/0209943 A1 | 9/2005 | Ballow et al. |
| 2002/0042756 A1 | 4/2002 | Kumar et al. | | 2005/0216325 A1 | 9/2005 | Ziad et al. |
| 2002/0049622 A1 | 4/2002 | Lettich et al. | | 2005/0216507 A1 | 9/2005 | Wright |
| 2002/0069144 A1 | 6/2002 | Palardy | | 2005/0222896 A1 | 10/2005 | Rhyne et al. |
| 2002/0073114 A1 * | 6/2002 | Nicastro et al. .................. 707/500 | | 2005/0234787 A1 | 10/2005 | Wallmeier et al. |
| 2002/0073396 A1 | 6/2002 | Crupi et al. | | 2005/0235020 A1 | 10/2005 | Gabelmann et al. |
| 2002/0078046 A1 | 6/2002 | Uluakar et al. | | 2005/0240592 A1 | 10/2005 | Mamou et al. |
| 2002/0082892 A1 | 6/2002 | Raffel et al. | | 2005/0246250 A1 | 11/2005 | Murray |
| 2002/0095650 A1 | 7/2002 | Green et al. | | 2005/0246482 A1 | 11/2005 | Gabelmann et al. |
| 2002/0100014 A1 | 7/2002 | Iborra et al. | | 2005/0256775 A1 | 11/2005 | Schapler et al. |
| 2002/0103660 A1 | 8/2002 | Cramon et al. | | 2005/0256882 A1 | 11/2005 | Able et al. |
| 2002/0104071 A1 * | 8/2002 | Charisius et al. ............. 717/109 | | 2005/0257125 A1 | 11/2005 | Roesner et al. |
| 2002/0107826 A1 | 8/2002 | Ramachandran et al. | | 2005/0257197 A1 | 11/2005 | Herter et al. |
| 2002/0120553 A1 | 8/2002 | Bowman-Amuah | | 2005/0262192 A1 | 11/2005 | Mamou et al. |
| 2002/0133368 A1 * | 9/2002 | Strutt et al. .................. 705/1 | | 2005/0262453 A1 | 11/2005 | Massasso |
| 2002/0138281 A1 | 9/2002 | Cirulli et al. | | 2005/0284934 A1 | 12/2005 | Ernesti et al. |
| 2002/0138358 A1 | 9/2002 | Scheer | | 2005/0288987 A1 | 12/2005 | Sattler et al. |
| 2002/0143598 A1 | 10/2002 | Scheer | | 2005/0289020 A1 | 12/2005 | Bruns et al. |
| 2002/0156695 A1 | 10/2002 | Edwards | | 2005/0289079 A1 | 12/2005 | Krishan et al. |
| 2002/0161907 A1 | 10/2002 | Moon | | 2006/0004802 A1 | 1/2006 | Phillips et al. |
| 2002/0165745 A1 | 11/2002 | Greene et al. | | 2006/0053063 A1 | 3/2006 | Nagar |
| 2002/0184111 A1 | 12/2002 | Swanson | | 2006/0064344 A1 | 3/2006 | Lidow |
| 2002/0188486 A1 | 12/2002 | Gil et al. | | 2006/0074704 A1 | 4/2006 | Shukla et al. |
| 2002/0198798 A1 | 12/2002 | Ludwig et al. | | 2006/0074731 A1 | 4/2006 | Green et al. |
| 2002/0198828 A1 | 12/2002 | Ludwig et al. | | 2006/0080338 A1 | 4/2006 | Seubert et al. |
| 2003/0009754 A1 | 1/2003 | Rowley et al. | | 2006/0085243 A1 | 4/2006 | Cooper et al. |
| 2003/0058277 A1 | 3/2003 | Bowman-Amuah | | 2006/0085294 A1 | 4/2006 | Boerner et al. |
| 2003/0069774 A1 | 4/2003 | Hoffman et al. | | 2006/0085336 A1 | 4/2006 | Seubert et al. |
| 2003/0074271 A1 | 4/2003 | Viswanath et al. | | 2006/0089886 A1 | 4/2006 | Wong |
| 2003/0074360 A1 | 4/2003 | Chen et al. | | 2006/0095439 A1 | 5/2006 | Buchamann et al. |
| 2003/0083762 A1 | 5/2003 | Farrah et al. | | 2006/0129978 A1 | 6/2006 | Abrari et al. |
| 2003/0084127 A1 | 5/2003 | Budhiraja et al. | | 2006/0143029 A1 | 6/2006 | Akbay et al. |
| 2003/0101112 A1 | 5/2003 | Gallagher et al. | | 2006/0149574 A1 | 7/2006 | Bradley et al. |
| 2003/0110067 A1 * | 6/2003 | Miller et al. .................. 705/8 | | 2006/0206352 A1 | 9/2006 | Pulianda |

| | | |
|---|---|---|
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0074150 A1 | 3/2007 | Jolfaei et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | Von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1* | 7/2007 | Berger et al. ............... 705/8 |
| 2007/0156493 A1* | 7/2007 | Tebbe et al. ............... 705/8 |
| 2007/0156499 A1* | 7/2007 | Berger et al. ............... 705/9 |
| 2007/0156500 A1* | 7/2007 | Merkel et al. ............... 705/9 |
| 2007/0156538 A1 | 7/2007 | Peter et al. |
| 2007/0156550 A1* | 7/2007 | Der Emde et al. ........... 705/35 |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233545 A1 | 10/2007 | Cala et al. |
| 2007/0233574 A1 | 10/2007 | Koegler et al. |
| 2007/0233575 A1 | 10/2007 | Berger et al. |
| 2007/0233581 A1 | 10/2007 | Peter |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265860 A1 | 11/2007 | Herrmann et al. |
| 2007/0265862 A1 | 11/2007 | Freund et al. |
| 2008/0004929 A9 | 1/2008 | Raffel et al. |
| 2008/0010049 A1 | 1/2008 | Pouchak et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2008/0263152 A1 | 10/2008 | Daniels et al. |
| 2008/0300959 A1 | 12/2008 | Sinha et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070391 A1 | 3/2010 | Storr et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

OTHER PUBLICATIONS

Kythe, Dave K. "The Promise of Distributed Business Components." AT&T Technical Journal, Mar./Apr. 1996.*
Woods, Dan. "Packaged Composite Applications: A Liberating Force for the User Interface." SAP Design Guild, Oct. 2003).*
SAP AG. "SAP NetWeaver". May 2005, http://www.lionbridge.com/NR/rdonlyres/4940BE1F-DA46-412E-AB16-F049BD865AC1/0/PBNWFAQ_50070686_en.pdf.*
SAP AG. "SAP Delivers Next Generation ERP to Customers." PR Newswire Association LLC, Mar. 2005.*
Kozaczynski, Wojtek. "Architecture Framework for Business Components." System Software Associates R&D Labs, IEEE 1998.*
Kythe, Dave K."The Promise of Distributed Business Components." AT&T Technical Journal, Mar./Apr. 1996.*
Vergil Technology (P) Limited."VCAB Suite Product Datasheet." 2001-2003.*
Woods, Dan."Packaged Composite Applications: A Liberating Force for the User Interface." SAP Design Guild, Oct. 2003).*
Prof Dr Henning Kagermann, & Dr Peter Zencke. (Sep. 8, 2005). Plug-and-play vision nears reality with BPM. Business Times, p. 09. Retrieved Jun. 12, 2012, from ProQuest Newsstand.*
SAP NetWeaver(TM) Empowers IT to Drive Innovation into Business Processes Across the Enterprise. (May 13). Canada NewsWire,1. Retrieved Jun. 12, 2012, from ProQuest Newsstand.*
Business Editors/Technology Writers. (Nov. 20). CrossWorlds Software Announces J2EE Interoperability With Open Standards Interface. Business Wire,1. Retrieved Jun. 12, 2012, from Business Dateline.*
Molina, Mattin, Sierra, Jose and Cuena, Jose." Reusable knowledge based components for building software applications: a knowledge modelling approach." International Journal of Software Engineering and Knowledge Engineering, vol. 9 No. 3 (1999) 297-317.*
Watson, Ed, Vaught, Sivia, Gutierrez, Dan and Rinks, Dan."ERP Implementation in State Government," Annals of Cases on Information Technology, 2003.*
Sundaraj, R.P., "An optimization approach to plan for reusable software components," Computing, Artificial Intelligence and Information Technology; European Journal of Operational Research 142 (2002) 128-137.*
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
"American Software Announces ASP Pricing Model for It's a-Applications Expense Business Solution"; PR Newswire; Mar. 6, 2000; 2 pages.
Anon.; "Sequent Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports 13,000 MAS 90 for WINDOWS Shipments in First Nine Months of Availability"; PR Newswire; Apr. 28, 1997.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyers' Guide to Software for Purchasing 2000.(Directory)"; Purchasing, vol. 129, No. 1; p. 179; Jul. 13, 2000.
Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Duc et al.; "Uniform Object Modeling Methodology and Reuse of Real Time System Using UML"; EMSOFT '05; Sep. 19-22, 2005; pp. 44-47.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

Gomaa et al.; "Model Based Software Design and Adaption"; International Workshop on Software Engineering for Adaptive and Self-Managing Systems (SEAMS '07); IEEE; 2007; 10 pages.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Huang, S. et al.; "Computer-Assisted Supply Chain Configuration Based on Supply Chain Operations Reference (SCOR) Model"; Computers & Industrial Engineering 48; 2005; pp. 377-394.

"Hudson's Bay Company Realizes Fast ROI with the Oracle E-Business Suite"; PR Newswire; New York; Jan. 15, 2002; p. 1.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Lambert et al.; "Supply Chain Metrics"; International Journal of Logistics Management; vol. 12, No. 1; 2001; pp. 1-19.

Linthicum, D.S.; "Chapter 9: RPCs, Messaging, and B2B Application Integration"; B2B Application Integration: E-Business Enable Your Enterprise; 2001; pp. 167-181.

Lockamy III, et al.; "Linking SCOR Planning Practices to Supply Chain Performance"; International Journal of Operationgs & Production Management; vol. 24, No. 12; pp. 1192-1218.

mySAP™ ERP 2005; Downloaded Mar. 24, 2010 from <http://web.archive.org/web/20061104021205/www.sap.com/solutions/business-suite/erp/pdf/BWP_SAP_ERP_2005.pdf>; 60 pages.

Nori A.K. et al.; "Composite Applications: Process Based Application Development"; Lecture Notes in Computer Science; vol. 2444; Aug. 2003; pp. 48-53.

"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Schultz, G.J.; "Keeping SCOR on Your Supply Chain: Basic Operations Reference Model Updates with the Times"; Information Strategy: The Executive's Journal; Summer 2003; pp. 12-20.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.

Vergil Technology Ltd.; "Vergil Composite Application Builder Suite"; Product Datasheet [online]; 2003; pp. 1-5; http://www.webservicesmall.com.docs/VCAB_datasheet.pdf.

Vogel et al.; "mySAP ERP for Dummies"; Published on Sep. 30, 2005; Downloaded on Mar. 23, 2001 from <http://proquest.safaribooksonline.com/9780764599958> 41 pages.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Mar. 25, 2009; 12 pages.
Office Action issued in U.S. Appl. No. 11/322,772; Dec. 9, 2009; 14 pages.
Office Action issued in U.S. Appl. No. 11/322,398 on Apr. 2, 2010; 39 pages.
Office Action issued in U.S. Appl. No. 11/322,383; Nov. 12, 2009; 29 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041; Apr. 30, 2009; 25 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Office Action issued in U.S. Appl. No. 11/396,288; Jan. 2, 2009; 26 pages.
Office Action issued in U.S. Appl. No. 11/396,288; Apr. 15, 2008; 26 pages.
Office Action issued in U.S. Appl. No. 11/396,288; Aug. 19, 2009; 20 pages.
Office Action issued in U.S. Appl. No. 11/396,258; Nov. 25, 2009; 9 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Sep. 4, 2009; 36 pages.
Office Action issued in U.S. Appl. No. 11/323,039; Apr. 14, 2010; 15 pages.
Office Action issued in U.S. Appl. No. 11/322,851; Sep. 2, 2009; 32 pages.
Office Action issued in U.S. Appl. No. 11/322,851; May 12, 2010; 15 pages.
Office Action issued in U.S. Appl. No. 11/323,040; Jul. 24, 2009; 35 pages.
Office Action issued in U.S. Appl. No. 11/323,040; Apr. 29, 2010; 17 pages.
Office Action issued in U.S. Appl. No. 11/322,612; May 11, 2009; 23 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Office Action issued in U.S. Appl. No. 11/322,482; Jan. 7, 2010; 19 pages.
Office Action issued in U.S. Appl. No. 11/323,590; Jan. 9, 2009; 23 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,590; Jun. 21, 2010; 25 pages.
Office Action issued in U.S. Appl. No. 11/323,634; Sep. 10, 2009; 15 pages.
Office Action issued in U.S. Appl. No. 11/323,634; Apr. 2, 2010; 9 pages.
Office Action issued in U.S. Appl. No. 11/322,816; Jul. 23, 2009; 41 pages.
Office Action issued in U.S. Appl. No. 11/322,816; Apr. 15, 2010; 27 pages.
Office Action issued in U.S. Appl. No. 12/333,085; Jun. 25, 2009; 9 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306.

Cool, David W.; "Activity Fund Accounting"; School Business Affairs; vol. 49, No. 6; Jun. 1983; pp. 50-52.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; pp. 1-208.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Office Action issued in U.S. Appl. No. 11/322,772; Jul. 12, 2010; 18 pages.
Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 1/322,382 on Sep. 20, 2010; 6 pages.
Notice of Allowance issued in U.S. Appl. No. 1/322,382 on Jan. 6, 2011; 7 pages.
Notice of Allowance issued in U.S. Appl. No. 11/396,259 on Jul. 6, 2010; 6 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 12/233,554 on Sep. 17, 2010; 10 pages.
Office Action issued in U.S. Appl. No. 12/233,550 on Jan. 12, 2011; 29 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 11/967,865 on Oct. 6, 2010; 6 pages.
Notice of Allowance issued in U.S. Appl. No. 11/322,482; Jul. 13, 2010; 5 pages.
Office Action issued in U.S. Appl. No. 11/322,973 on Dec. 7, 2010; 13 pages.
Office Action issued in U.S. Appl. No. 11/404,147 on Nov. 24, 2010; 27 pages.
Notice of Allowance issued in U.S. Appl. No. 12/233,462 on Feb. 2, 2011; 11 pages.
Office Action issued in U.S. Appl. No. 11/967,483; Aug. 20, 2010; 10 pages.
Notice of Allowance issued in U.S. Appl. No. 12/333,085; Sep. 13, 2010; 8 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on May 27, 2011; 15 pages.
Office Action issued in U.S. Appl. No. 11/404,147 on Aug. 4, 2011; 26 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967, 483 on Mar. 4, 2011; 6 pages.
Office Action issued in U.S. Appl. No. 12/327,232 on May 26, 2011; 20 pages.

Office Action issued in U.S. Appl. No. 12/327,590 on Jun. 23, 2011; 16 pages.
Office Action issued in U.S. Appl. No. 12/233,087 on Aug. 18, 2011; 42 pages.
Notice of Allowance issued in U.S. Appl. No. 12/233,534 on May 16, 2011; 12 pages.
Notice of Allowance issued in U.S. Appl. No. 11/322,382 on Jul. 25, 2011; 5 pages.
Notice of Allowance issued in U.S. Appl. No. 11/322,610 on Mar. 31, 2011; 6 pages.
Notice of Allowanced issued in U.S. Appl. No. 11/322,398 on May 27, 2011; 21 pages.
Notice of Allowance issued in U.S. Appl. No. 11/396,259 on Aug. 5, 2011; 7 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Notice of Allowance issued in U.S. Appl. No. 11/322,845; Apr. 8, 2011; 8 pages.
Office Action issued in U.S. Appl. No. 11/323,040 on Jul. 26, 2011; 34 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Aug. 2; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremer, Tibor; "Outsourcing Decision Support: A Survey of Benefits, Risks, and Decision Factor"; Supply Chain Management; V. 11; 2006; pp. 467-482.
Sarjoughian et al.; "CoSMOs: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance in U,S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Office Action issued in U.S. Appl. No. 12/327,701 on Nov. 8, 2011; 20 pages.
Notice of Allowanced issued in U.S. Appl. No. 11/322,398 on Oct. 18, 2011; 7 pages.
Office Action issued in U.S. Appl. No. 11/322,383 on May 12, 2010; 23 pages.
Office Action issued in U.S. Appl. No. 11/322,383 on Nov. 12, 2009; 23 pages.
Examiner's Answer to Appeal Brief issued in U.S. Appl. No. 11/396,236 on Nov. 10, 2011; 19 pages.
Office Action issued in U.S. Appl. No. 11/396,288 on Oct. 17, 2011; 38 pages.
Notice of Allowance issued in U.S. Appl. No. 11/396,250 on Dec. 7, 2011; 6 pages.
Office Action issued in U.S. Appl. No. 11/396,252 on Nov. 10, 2011; 18 pages.
Notice of Allowance issued in U.S. Appl. No. 11/322,845; Nov. 13, 2011; 9 pages.
Office Action issued in U.S. Appl. No. 11/397,026; Jul. 21, 2009; 28 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Notice of Allowance issued in U.S. Appl. No. 11/967,393 on Nov. 9, 2011; 9 pages.
"IDe Partners with Journyx to Offer Customers Best-in-Class Time Management Solution"; PR Newswire; Mar. 8, 2005; Business Dateline.
Kloppmann et al.; "Business Process Choreography in WebSphere: Combining the Power of BPEL and J2EE"; IBM Systems Journal; 2004.
Mani et al.; "Towards Information Networks to Support Composable Manufacturing"; PerMIS 2008.
Meseroll, Robert; "Data Mining Navy Flight"; IEEE Autotestcom 2007; Sep. 2007; pp. 476-481.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Zeng et al.; "Model Analysis for Business Event Processing"; IBM Systems Journal 2007.
Zimmermann et al.; "Service-Oriented Architecture and Business Process Choreography in an Order Management Scenario: Rationale, Concepts, Lessons Learned"; OOPLA 2005.

Notice of Allowance issued in U.S. Appl. No. 11/322,382 on May 21, 2012; 5 pages.
Notice of Allowance issued in U.S. Appl. No. 11/322,383 on May 21, 2012; 14 pages.
Notice of Allowance issued in U.S. Appl. No. 11/322,851 on Mar. 1, 2012; 9 pages.
Notice of Allowance issued in U.S. Appl. No. 11/323,039 on Jun. 7, 2012; 9 pages.
Notice of Allowance issued in U.S. Appl. No. 11/323,040 on Jun. 8, 2012; 9 pages.
Notice of Allowance issued in U.S. Appl. No. 11/323,634 on Jan. 25, 2012; 5 pages.
Notice of Allowance issued in U.S. Appl. No. 11/396,250 on Jul. 10, 2012; 6 pages.
Notice of Allowance issued in U.S. Appl. No. 11/396,258 on Feb. 3, 2012; 12 pages.
Notice of Allowance issued in U.S. Appl. No. 11/396,259 on Mar. 15, 2012; 7 pages.
Notice of Allowance issued in U.S. Appl. No. 11/396,288; Apr. 27, 2012; 15 pages.
Notice of Allowance issued in U.S. Appl. No. 11/397,026 on Feb. 23, 2012; 8 pages.
Notice of Allowance issued in U.S. Appl. No. 11/404,147 on Jul. 5, 2012; 17 pages.
Notice of Allowance issued in U.S. Appl. No. 12/233,075 on Mar. 22, 2012; 25 pages.
Notice of Allowance issued in U.S. Appl. No. 12/233,087 on Mar. 30, 2012; 30 pages.
Notice of Allowance issued in U.S. Appl. No. 12/233,289 on Feb. 15, 2012; 11 pages.
Notice of Allowance issued in U.S. Appl. No. 12/233,417 on Jul. 27, 2012; 10 pages.
Notice of Allowance issued in U.S. Appl. No. 12/233,457 on May 16, 2012; 7 pages.
Notice of Allowance issued in U.S. Appl. No. 12/233,458 on May 1, 2012; 17 pages.
Notice of Allowance issued in U.S. Appl. No. 12/233,462 on Apr. 5, 2012; 7 pages.
Notice of Allowance issued in U.S. Appl. No. 12/233,534 won Dec. 28, 2011; 7 pages.
Notice of Allowance issued in U.S. Appl. No. 12/233,534 won Jul. 18, 2012; 16 pages.
Notice of Allowance issued in U.S. Appl. No. 12/233,550 on Jan. 9, 2012; 11 pages.
Notice of Allowance issued in U.S. Appl. No. 12/327,232 on Jun. 6, 2012; 7 pages.
Notice of Allowance issued in U.S. Appl. No. 12/327,354 on Jul. 25, 2012; 17 pages.
Notice of Allowance issued in U.S. Appl. No. 12/327,590 on Dec. 28, 2011; 10 pages.
Notice of Allowance issued in U.S. Appl. No. 12/327,590 on Jul. 19, 2012; 11 pages.
Notice of Allowance issued in U.S. Appl. No. 12/327,701 on Apr. 6, 2012; 9 pages.
Notice of Allowance issued in U.S. Appl. No. 12/327,737 on Jul. 10, 2012; 7 pages.
Notice of Allowance issued in U.S. Appl. No. 12/332,965 on Jun. 11, 2012; 21 pages.
Notice of Allowanced issued in U.S. Appl. No. 11/322,398 on May 3, 2012; 7 pages.
Supplemental Notice of Allowance issued in U.S. Appl. No. 12/333,085; Jun. 13, 2012; 5 pages.
Office Action issued in U.S. Appl. No. 11/322,482; Aug. 21, 2012; 27 pages.
Office Action issued in U.S. Appl. No. 11/322,612 on Jun. 26, 2012; 11 pages.
Office Action issued in U.S. Appl. No. 11/322,816 on Jun. 7, 2012; 12 pages.
Office Action issued in U.S. Appl. No. 11/323,041 on Jun. 7, 2012; 12 pages.
Office Action issued in U.S. Appl. No. 11/967,387 on Apr. 12, 2012; 13 pages.
Office Action issued in U.S. Appl. No. 11/967,489 on Feb. 6, 2012; 9 pages.
Office Action issued in U.S. Appl. No. 12/233,479 on May 7, 2012; 26 pages.
Office Action issued in U.S. Appl. No. 12/233,489 on Jun. 6, 2012; 87 pages.
Office Action issued in U.S. Appl. No. 12/327,737 on Mar. 26, 2012; 14 pages.
Office Action issued in U.S. Appl. No. 12/333,146 on Feb. 2, 2012; 21 pages.
Office Action issued in U.S. Appl. No. 13/413,069 on Aug. 1, 2012; 45 pages.

* cited by examiner

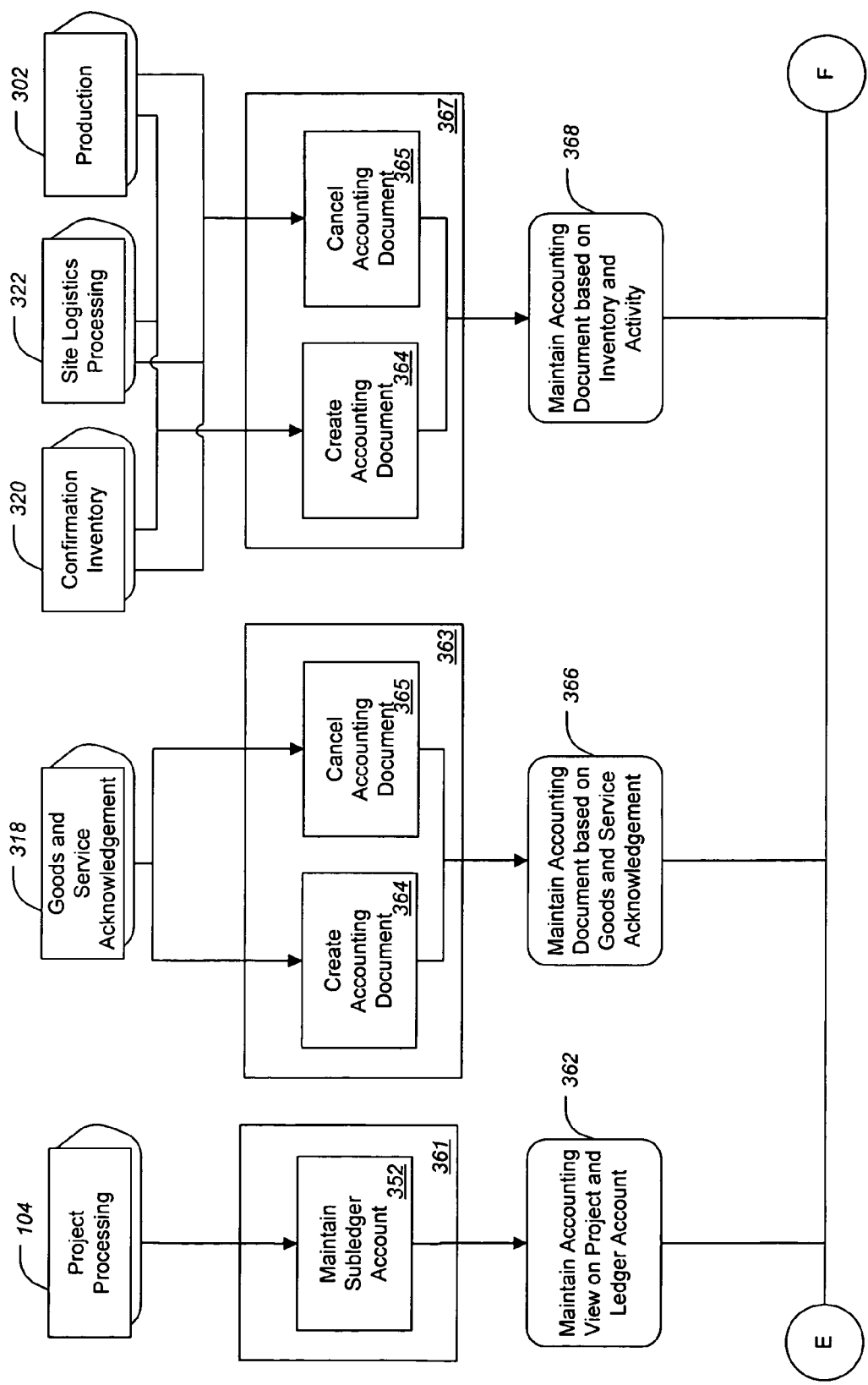

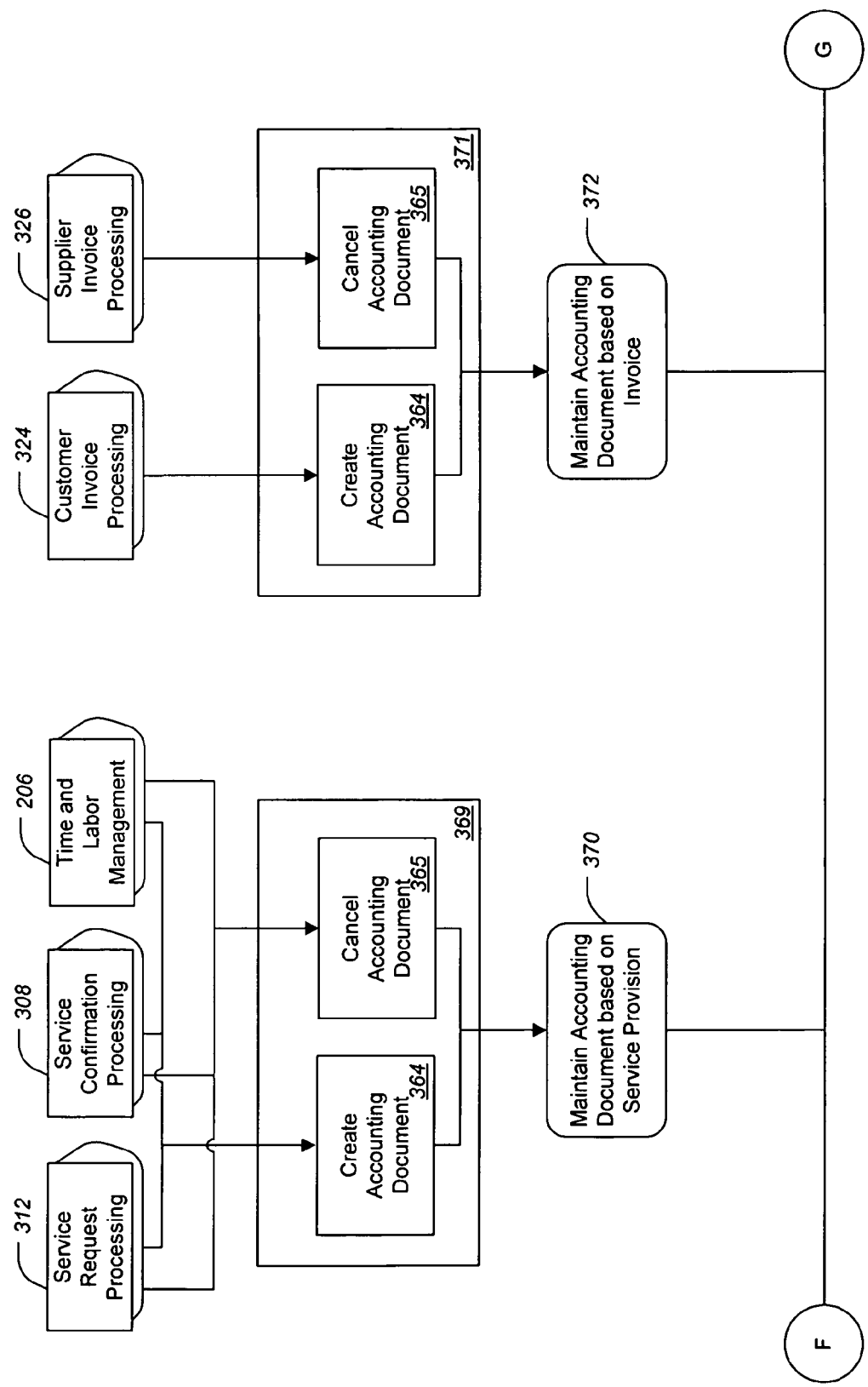

PROVIDING ACCOUNTING SOFTWARE APPLICATION AS ENTERPRISE SERVICES

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes a services architecture design that provides enterprise services having accounting functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having accounting functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

FIGS. 3A, 3B, 3C, 3D and 3E are block diagrams collectively showing an accounting process component.

Like reference numbers and designations in the various drawings indicate like elements.

DETAILED DESCRIPTION

Figure 1A:
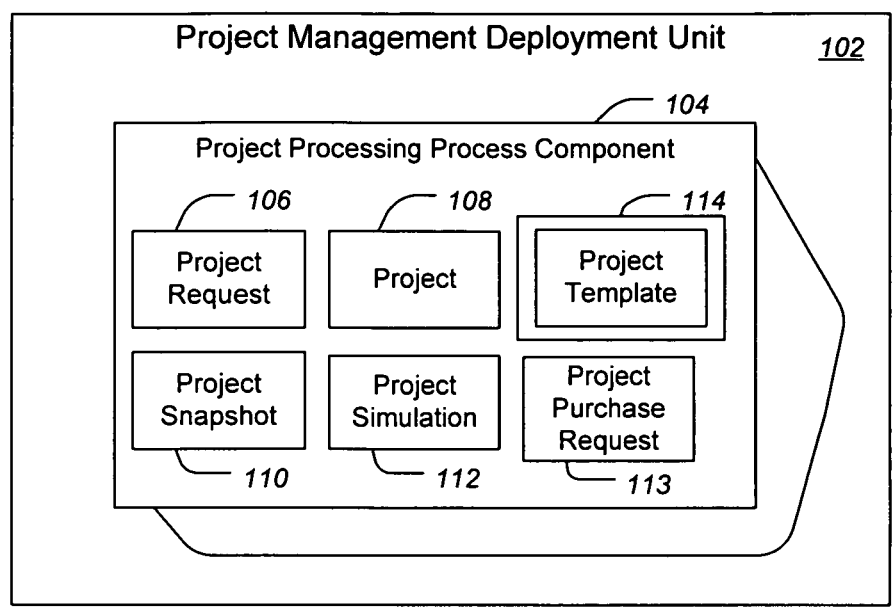
FIGS. 1A, 1B, 1C, and 1D collectively illustrate a high-level view of a software architectural design and implementation of a suite enterprise software services having accounting functionality.

FIGS. 1A, 1B, 1C, and 1D collectively illustrate a high-level view of a software architectural design, and of application software implementations of the design, that provides a suite of enterprise service operations, which can be organized into interfaces, having accounting application functionality.

The elements of the architecture include the business object, the process component, the service operation (or simply, the operation), the service interface, the message, and the deployment unit. The elements can also include process agents and reuse service components. These will be generally described below.

In one implementation, the software is implemented to be deployed on an application platform that includes a foundation layer that contains all fundamental entities that can used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term is generally clear from the context, so the distinction will be made explicitly only when necessary. Properly implemented, business objects are implemented free of redundancies.

Business objects are further categorized as business process objects, master data objects, mass data run objects, dependent objects, and transformed objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have own persistency.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also include the service interface, which may be referred to simply as an interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIGS. 1A, 1B, 1C, and 1D collectively illustrate a high-level view of a software architectural design and implementation of a suite enterprise software services having accounting functionality.

As shown in FIG. 1A, a Project Management deployment unit 102 includes a Project Processing process component 104, a Project Request business object 106, a Project business object 108, a Project Snapshot business object 110, a Project Simulation business object 112, a Project Purchase Request 113, and a Project Template master data object 114.

Figure 1B:
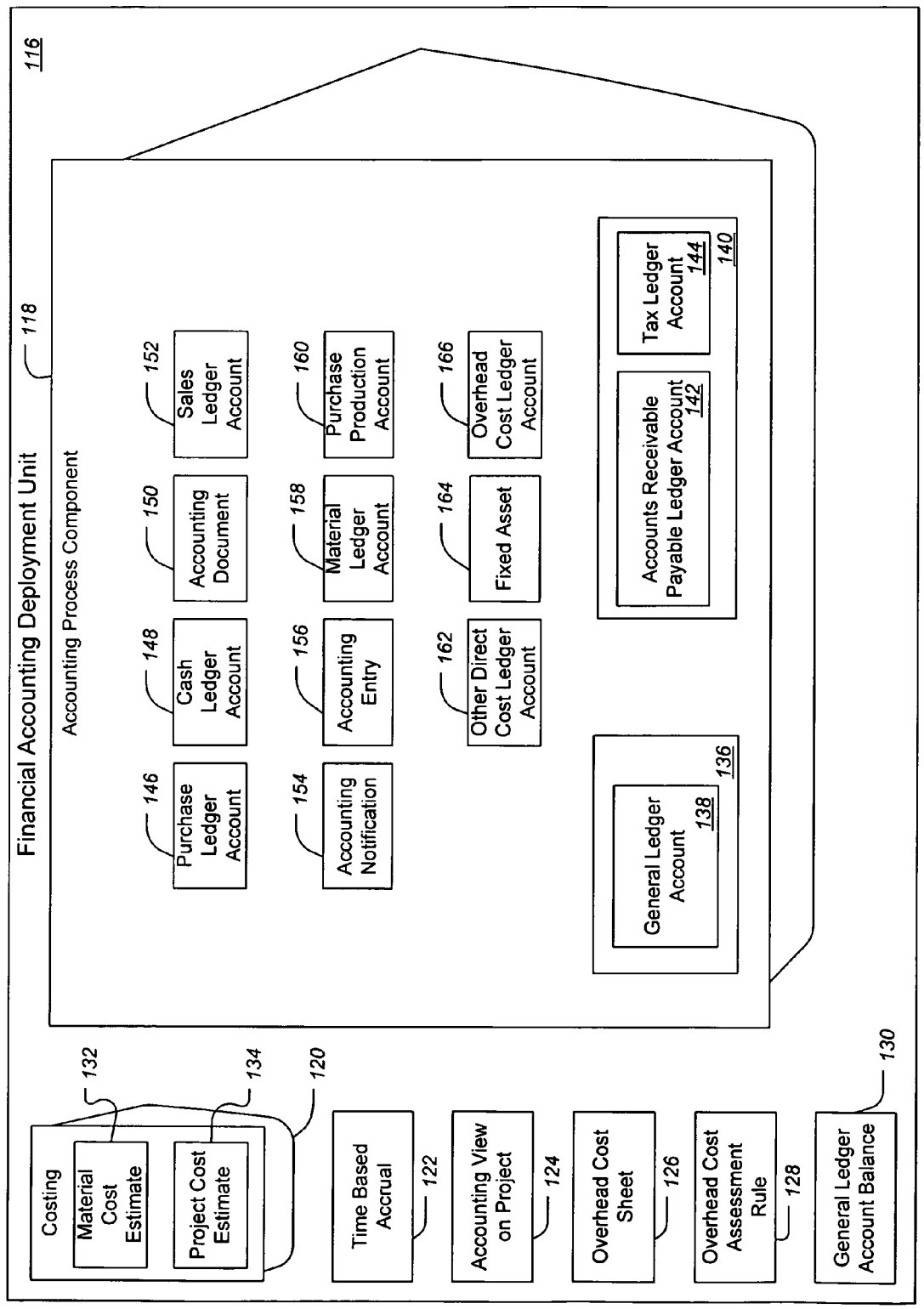

As shown in FIG. 1B, a Financial Accounting deployment unit 116 includes: an Accounting process component 118, a Costing process component 120, a Time Based Accrual business object 122, an Accounting View on Project business object 124, an Overhead Cost Sheet business object 126, an Overhead Cost Assessment Rule business object 128, a Financial Accounting Master Data Management process component 167, and a General Ledger Account Balance business object 130.

The Costing process component 120 includes a Material Cost Estimate business object 132 and a Project Cost Estimate business object 134. The Project process component 104 includes two interfaces with operations, several business objects as well as multiple business process objects. The first interface is a General Ledger Account interface 136 that includes a General Ledger Account operation 138. The second interface is an Accounts Receivable/Payable Ledger Account interface 140 that includes an Accounts Receivable Payable Ledger Account operation 142 and a Tax Ledger Account operation 144.

The Accounting process component 118 includes eleven business objects: a Purchase Ledger Account business object 146, a Cash Ledger Account business object 148, an Accounting Document business object 150, a Sales Ledger Account business object 152, an Accounting Notification business object 154, an Accounting Entry business object 156, a Material Ledger Account business object 158, a Purchase Production Account business object 160, an Other Direct cost Ledger Account business object 162, a Fixed Asset business object 164, and an Overhead Cost Ledger Account business object 166.

Figure 1C:
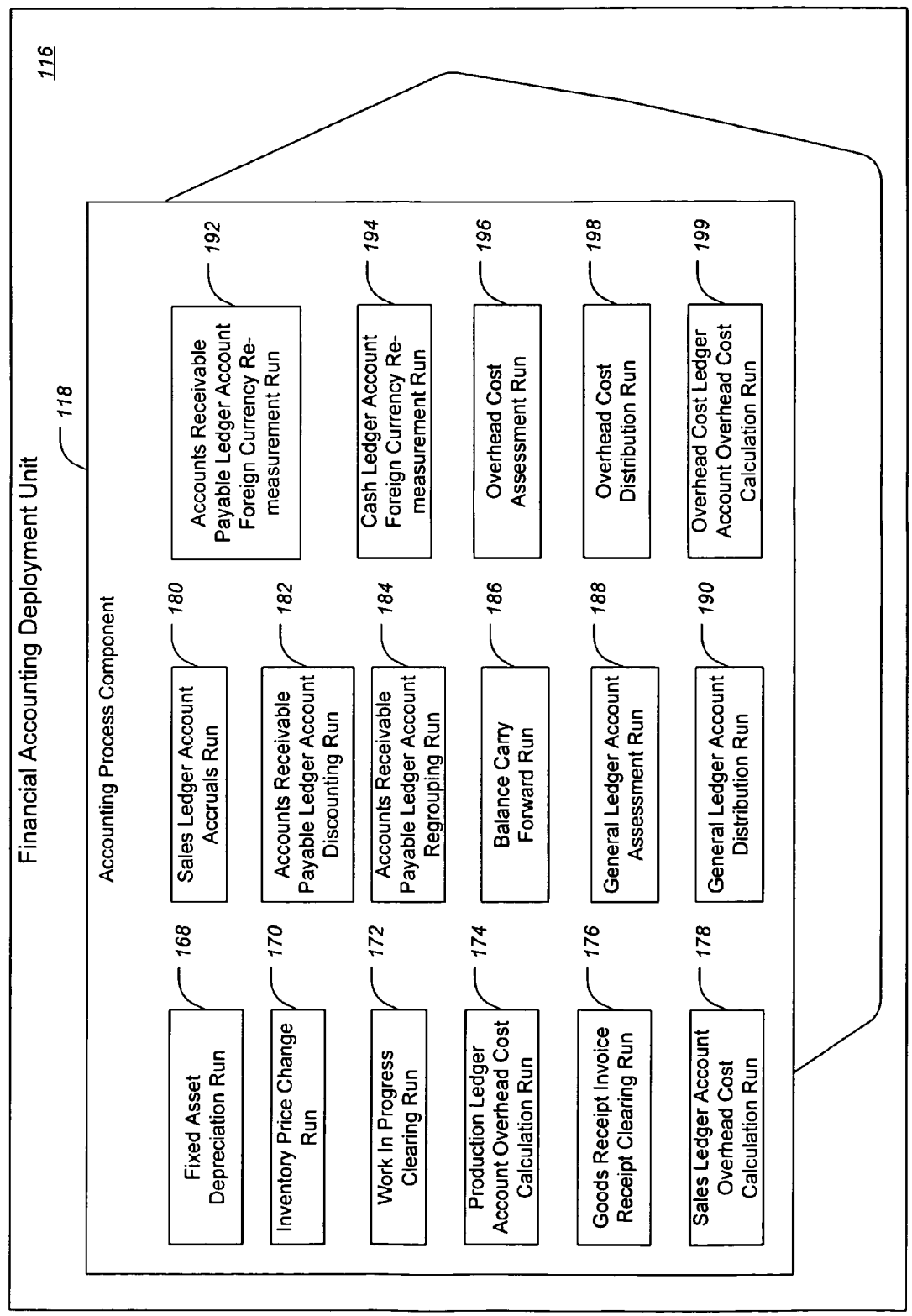

As shown in FIG. 1C, the Accounting process component 118 also includes seventeen business process objects: a Fixed Asset Depreciation Run business process object 168, an Inventory Price Change Run business process object 170, a Work In Progress Clearing Run business process object 172, a Production Ledger Account Overhead Cost Calculation Run business process object 174, a Goods Receipt Invoice Receipt Clearing Run business process object 176, a Sales Ledger Account Overhead Cost Calculation Run business process object 178, a Sales Ledger Account Accruals Run business process object 180, an Accounts Receivable Payable Ledger Account Discounting Run business process object 182, an Accounts Receivable Payable Ledger Account Regrouping Run business process object 184, a Balance Carry Forward Run business process object 186, a General Ledger Account Assessment Run 188, a General Ledger Account Distribution Run business process object 190, an Accounts Receivable Payable Ledger Account Foreign Currency Re-measurement run business process object 192, a Cash Ledger Account Foreign Currency Re-measurement Run business process object 194, an Overhead cost Assessment Run business process object 196, an Overhead Cost Distribution Run business process object 198, and an Overhead cost Ledger Account Overhead Cost Calculation Run business process object 199.

The Project Request business object 106 is a specialization of a project simulation. The Project Request business object 106 can be used to simulate several alternative project setups. For example, an operational project is a copy of one selected project request.

The Project Simulation business object 112 is a specialization of a project that is used for "what-if" simulations, once the operational project is executed, to find out about the effect of changes on the operational project. Project simulations can be reconciled with the operation projects.

The Project Purchase Request business object 113 is a request to purchasing for procurement of products from a project, or with reference to a project. The request may provide a detailed description of the products that are to be procured, the quantities required, or the time at which the products need to be available. The Project Purchase Request business object 113 may also monitor procurement documents.

The Project Template master data object 114 defines the structure and non-operational data of a project. The Project Template master data object 114 can be used for a standardized project planning an execution. For example, a new project may be generated from a project template.

Figure 1D:
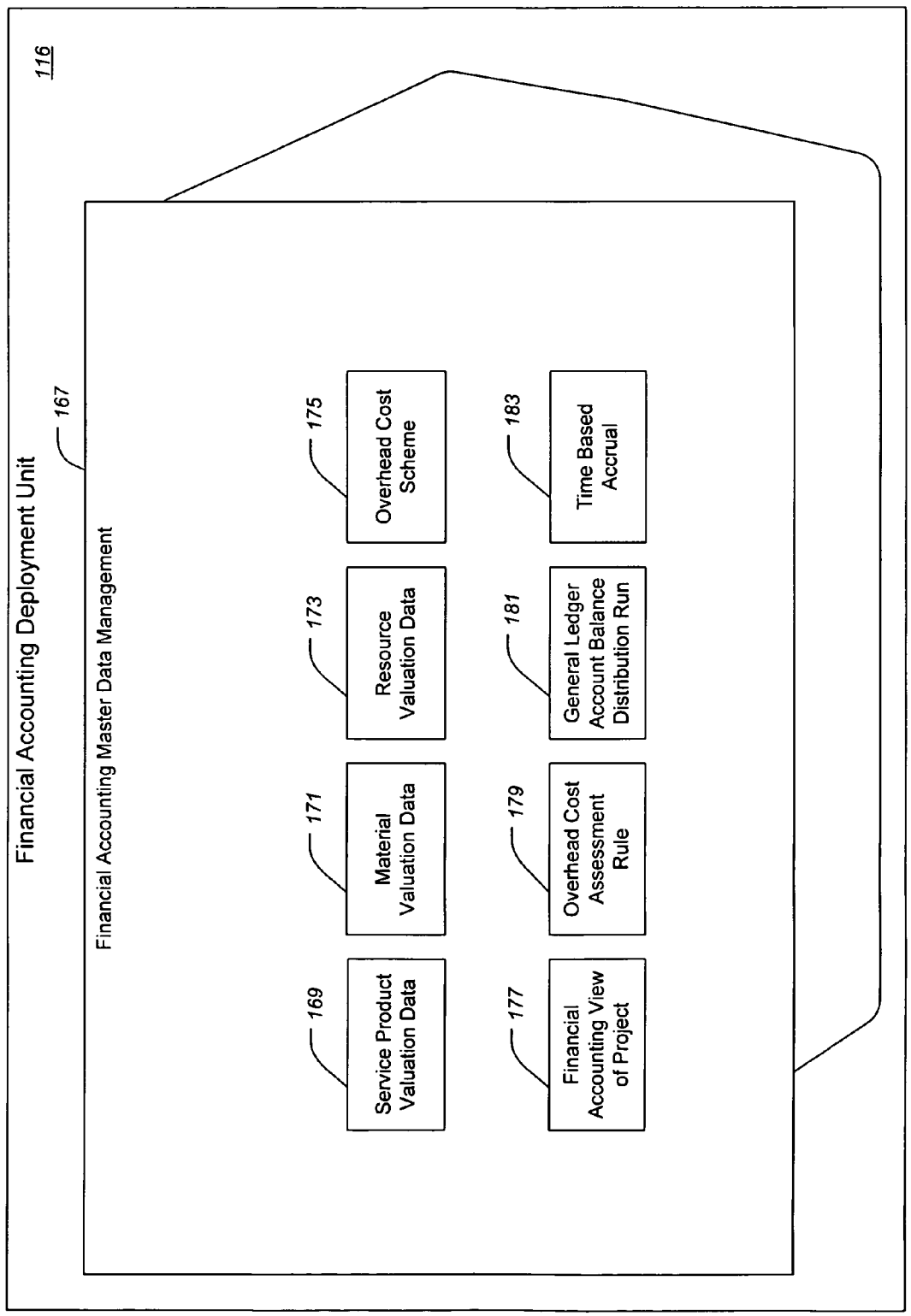

As shown in FIG. 1D, the Financial Accounting Master Data Management process component 167 includes eight business objects: a Service Product Valuation Data business object 169, a Material Valuation Data business object 171, a Resource Valuation Data business object 173, an Overhead Cost Scheme business object 175, a Financial Accounting View of Project business object 177, an Overhead Cost Assessment Rule business object 179, a General Ledger Account Balance Distribution Run business object 181, and a Time Based Accrual business object 183.

The Service Product Valuation Data business object 169 represents internal prices for the valuation of business transactions related to a service product or a service product group and for cost estimation. These attributes and prices may depend on organizational units and other Financial Accounting entities such as a Set Of Books or an Accounting Period.

The Material Valuation Data business object 171 represents internal prices for the valuation of business transactions related to a material or a material group, for material inventory valuation and for cost estimation. These attributes and prices may depend on organizational units, orders with reference to a material such as a sales order, production lot, project and other Financial Accounting entities.

The Resource Valuation Data business object 173 represents attributes and internal cost rates for the valuation of business transactions related to a resource and for cost estimation.

The Overhead Cost Scheme business object 175 represents a set of rules for the calculation of overhead charges. The rules define the base data and the corresponding overhead rates. The overhead cost scheme consists of a language-dependent description of one or more lines along with rate rules and offsetting rules used in the lines.

The Financial Accounting View of Project business object 177 represents a Financial Accounting project and its structure. A Financial Accounting View Of Project contains only the elements and characteristics of a project relevant to Financial Accounting. The project data may be kept in Financial Accounting centrally in order to assign the values of business transactions and costing to projects in Financial Accounting.

The Overhead Cost Assessment Rule business object 179 specifies which costs are to be allocated, the receivers and the assessment base to calculate the charges. The Overhead Cost Assessment Rule business object 179 may be used for the assessment of overhead cost to the proper originators.

The General Ledger Account Balance Distribution Run business object 181 specifies which balances accrued on Profit And Loss or Balance Sheet Accounts are to be distributed. It also defines receivers of the amount and the distribution base to calculate the charges. The General Ledger Account Balance Distribution Run business object 181 may be used to assign profit centers, or to distribute revenues and balance sheet items according to key figures.

The Time Based Accrual business object 183 represents an assignment of revenues or expenses relating to services provided over a period to the correct periods in terms of accepted accounting practice. Accruals are created when the payment transaction and the effect on net income occur in different reporting periods. Period-based accruals occur when the service provided and the corresponding effect on net income relate to the same period. Accruals relate to a deferral when an effected payment is not reported as income until a subsequent period, whereas accruals relate to an accrual when payment is reported as income before it has been made.

Figure 2A:
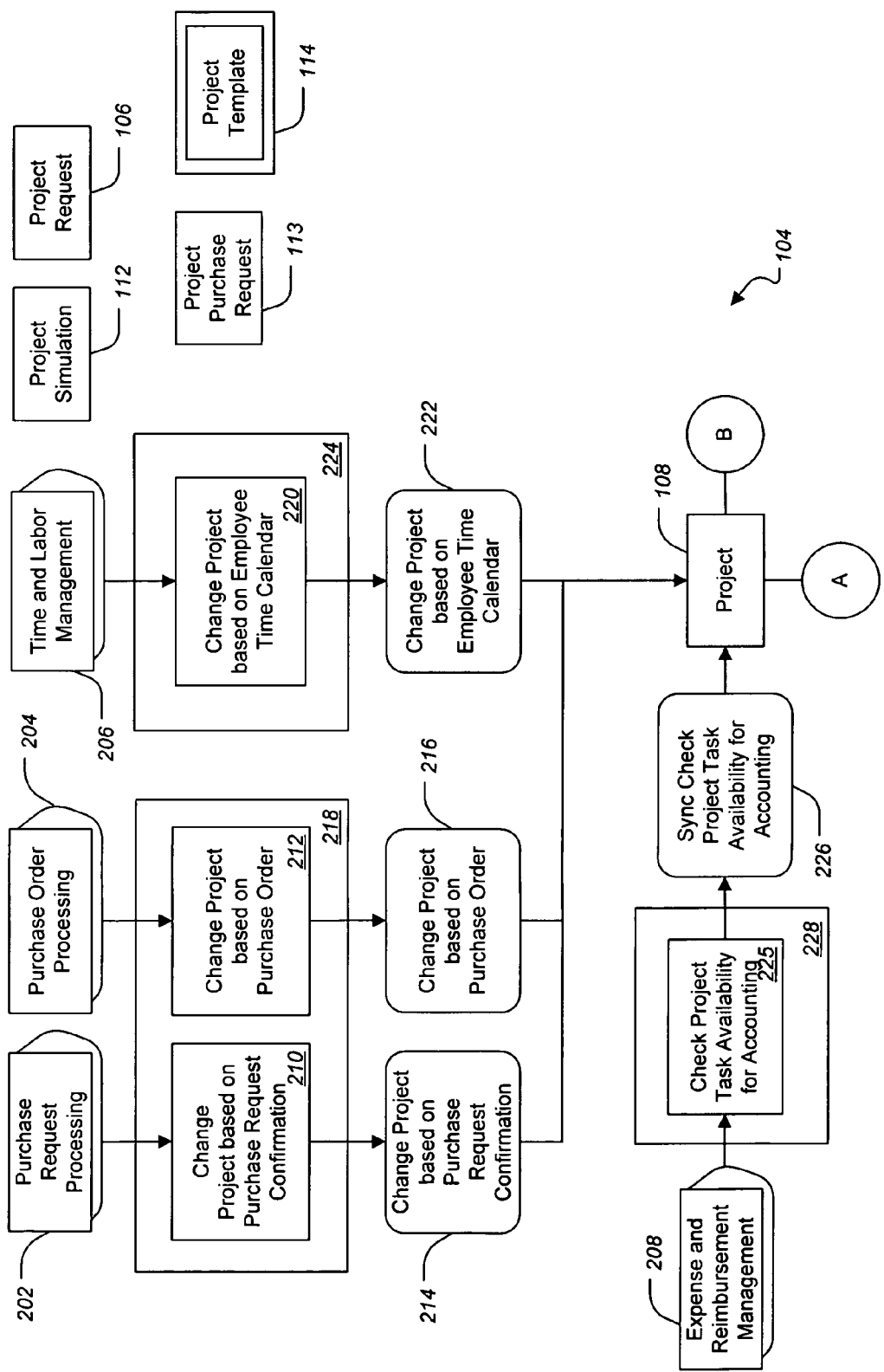
FIGS. 2A, 2B and 2C are block diagrams collectively showing a project processing process component.
Figure 2B:
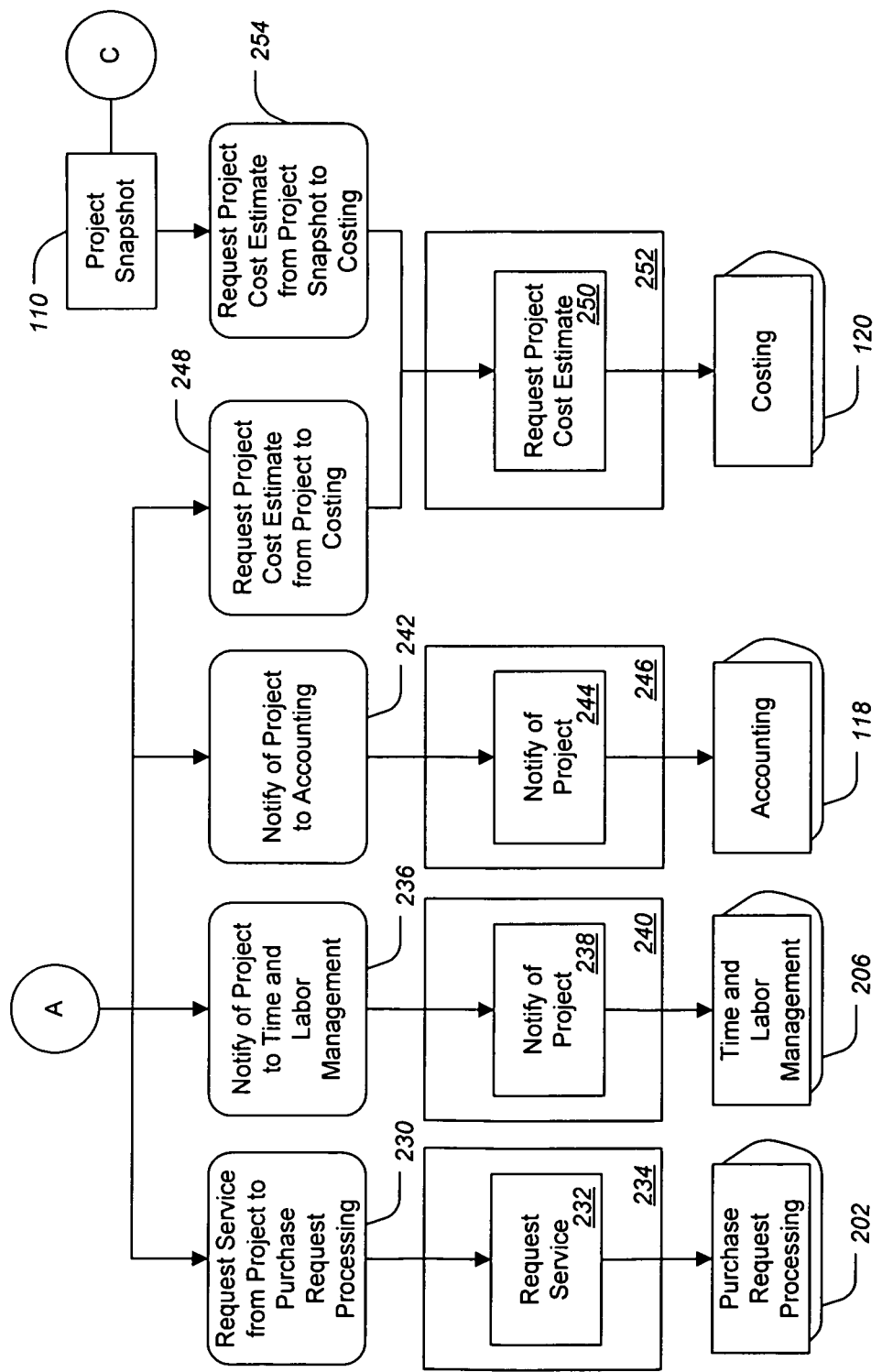
Figure 2C:
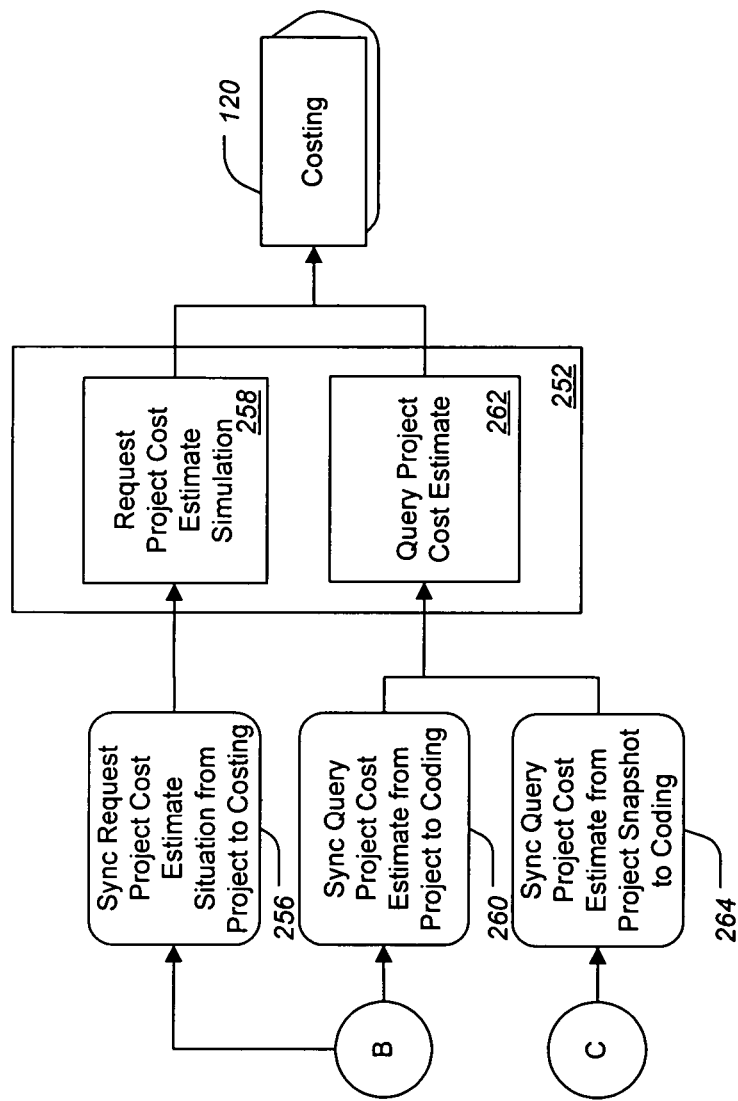

FIGS. 2A, 2B and 2C are block diagrams collectively showing the Project Processing process component 104 (FIG. 1A). For convenience in describing this process component, a number of other process components are shown in the figures; these other process components are not part of the process component being described. These other process components are a Purchase Request Processing process component 202, a Purchase Order Processing process component 204, a Time and Labor Management process component 206 and an Expense and Reimbursement Management process component 208. These other process components are used to represent software external to the process component in describing its interactions with the external software; however, while the external software can be implemented as such process components, this is not required.

A Change Project based on Purchase Request Confirmation operation 210 sends a purchase request confirmation using a Change Project based on Purchase Request Confirmation asynchronous outbound process agent 214 to update the Project business object 108. For example, the operation 210 can send a purchase request confirmation to update the Project business object 108 if input is received from the Purchase Request Processing process component 202.

A Change Project based on Purchase Order operation 212 sends a purchase order notification using a Change Project based on Purchase Order asynchronous outbound process agent 216 to update the Project business object 108. For example, the operation 212 can send a purchase order notification if input is received from the Purchase Order Processing process component 204.

The Project based on Purchase Request Confirmation operation 210 and the Change Project based on Purchase Order operation 212 are included in a Purchasing In asynchronous interface 218. The Purchasing In asynchronous interface 218 informs about the creation of a purchase order for an external resource that was ordered by the project manager.

A Change Project based on Employee Time Calendar operation 220 sends a project task confirmation notification using a Change Project based on Employee Time Calendar asynchronous outbound process agent 222 to update the Project business object 108. For example, the operation 220 can send a confirmation notification if input is received from the Time and Labor Management process component 206.

The Change Project based on Employee Time Calendar operation 220 is included in a Project Task Confirmation In interface 224. The Project Task Confirmation In interface 224 confirms working time for a project task. For example, the confirmation can contain working times and additional information such as status, short text, or remaining work.

A Check Project Task Availability for Accounting operation 225 sends an accounting coding block check request using a Synchronous Check Project Task Availability for Accounting outbound process agent 226 to update the Project business object 108. For example, the operation 224 can send a check request if input is received from the Expense and Reimbursement Management process component 208. The Check Project Task Availability for Accounting operation 224 is included in a Project Task Availability In interface 228.

The Project business object 108 can receive updated information and send the update into other components to perform further operations. As shown in FIG. 2B, multiple process agents can receive information from the Project business object 108.

A Request Service from Project to Purchase Request Processing asynchronous outbound process agent 230 invokes a Request Service operation 232, which is a request from a project manager asking a buyer to procure external resources or services. The Request Service operation 232 is included in a Purchasing Out interface 234. As an example, the operation 230 can then send a purchase request to a Purchase Request Processing process component 202.

A Notify of Project to Time and Labor Management asynchronous process agent 236 invokes a Notify of Project operation 238, which publishes or un-publishes project tasks with assigned human resources. The Notify of Project operation 238 is included in a Project Task Confirmation Out interface 240. As an example, the operation 238 can then send a notification to a Time and Labor Management process component 202.

A Notify of Project to Accounting asynchronous outbound process agent 242 invokes a Notify of Project operation 244, where accounting document processing is informed about the creation or the change of project elements that may be accounted. The Notify of Project operation 244 is included in a Project Accounting Out interface 246. As an example, the operation 244 can then send a notification to the Accounting process component 118.

A Request Project Cost Estimate from Project to Costing asynchronous outbound process agent 248 invokes a Request Project Cost Estimate operation 250, where document processing is requested to perform a synchronous project costing simulation. The Request Project Cost Estimate operation 250 is included in a Project Costing Out interface 252.

Information can also be sent from the Project Snapshot business object 110. The Project Snapshot business object 110 sends information to a Request Project Cost Estimate from Project Snapshot to Costing asynchronous outbound process agent 254, which invokes the Request Project Cost Estimate operation 250. As an example, the operation 250 can then send an estimate to the Costing process component 120.

As shown in FIG. 2C, a Synchronous Request project Cost Estimate Situation from Project to Costing outbound process agent 256 invokes a Request Project Cost Estimate Simulation operation 258 where costing document processing is requested to perform a synchronous project costing simulation. A Synchronous Query Project Cost Estimate from Project to Coding outbound process agent 260 invokes a Query Project Cost Estimate operation 262. In addition, a Synchronous Query Project Cost Estimate from Project Snapshot to Coding outbound process agent 264 can also invoke the Query Project Cost Estimate operation 262. As an example, the operation 262 can then send an estimate to the Costing process component 120.

FIGS. 3A, 3B, 3C, 3D and 3E are block diagrams collectively showing the Accounting process component 118 (FIG. 1B). For convenience in describing this process component, a number of external process components are shown in the figures; these other process components are not part of the process components being described. These other process components are a Production process component 302, the Purchase Order Processing process component 204, a Customer Return Processing process component 304, a Customer Complaint Processing process component 306, a Service confirmation Processing process component 308, a Service Contract Processing process component 310, a Service Request Processing process component 312, a Service Order Processing process component 314, a Sales Order Processing process component 316, the Project Processing process component 104, a Goods and Service Acknowledgement process component 318, a Confirmation and Inventory process component 320, a Site Logistics Processing process component 322, a Payment Processing process component 323, a Customer Invoice Processing process component 324, a Due Item Processing process component 325, a Supplier Invoice Processing process component 326, and an Expense and Reimbursement Management process component 327.

Figure 3A:
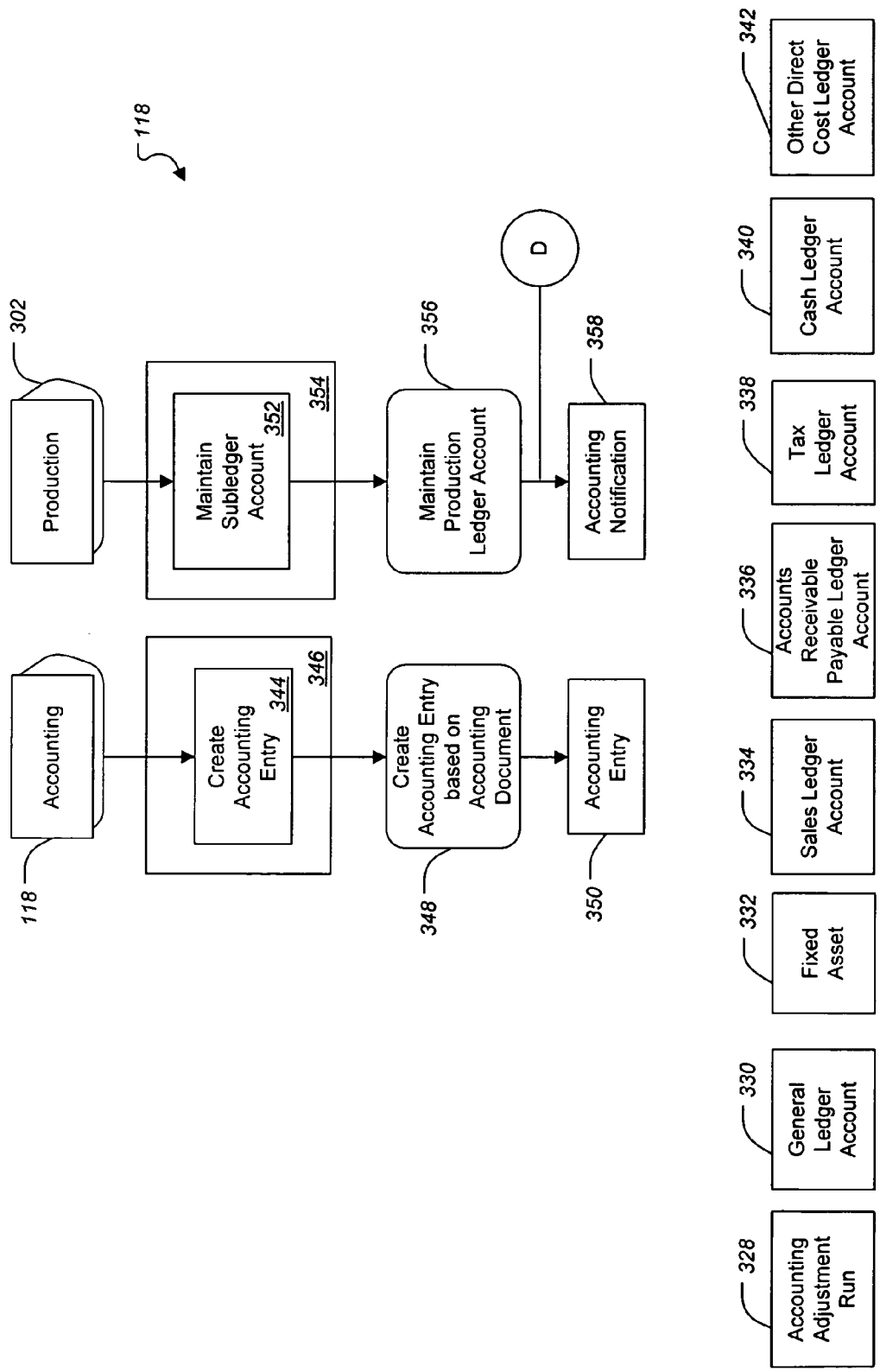

As shown in FIG. 3A, several business objects are included in the Accounting process component, but are not shown in the interactions. These include an Accounting Adjustment Run business object 328: an automatic valuation of, or an automatic value changing processing for a set of ledger accounts using the appropriate methods at a specified key date; a General Ledger Account business object 330: a view of the value of assets, liabilities, equity, revenues and expenses for financial accounting purposes; a Fixed Asset business object 332: a view of one or more objects, rights, or other items owned by the enterprise that is intended for long-term use, and can be identified individually in the financial statements; a Sales Ledger Account business object 334: a view of sales activities defined for financial accounting purposes; an Accounts Receivable Payable Ledger Account business object 336: a record of valuated payables and receivables of a Company for a specific business partner; a Tax Ledger Account business object 338: a summary of tax liabilities defined for financial accounting purposes; a Cash Ledger Account business object 340: a record of the valuated liquid assets of a company; and an Other Direct Cost Ledger Account business object 342: a record of debit and credit entries belonging to a company that shows the effect of business transactions on costs as a result of a particular job or activity.

A Create Accounting Entry operation 344 is included in an Accounting Document Accounting In interface 346. The Create Accounting Entry operation 344 can receive an accounting document from an instance of the Accounting process component 118. A Create Accounting Entry based on Accounting Document outbound process agent 348 receives information from the operation 344 and updates an Accounting Entry business object 350. The Accounting Entry business object 350 is used to directly enter business transactions in Financial Accounting for one or several sets of books. An Accounting Entry does not affect any operational component, therefore, it can be used for General Ledger entries, cost accounting reassignments, revaluations and other transactions without operational aspects.

A Maintain Subledger Account operation 352 is included in a Production Accounting In interface 354. The Maintain Subledger Account operation 352 receives order accounting notifications from production. The notification is to inform accounting processing about creation, change or deletion of production orders. A Maintain Production Ledger Account inbound process agent 356 updates an Accounting Notification business object 358. The Accounting Notification business object 358 is a common input channel for all kinds of operational business transactions into Financial Accounting that is called by operational components in order to record the business transactions in Financial Accounting.

Figure 3B:
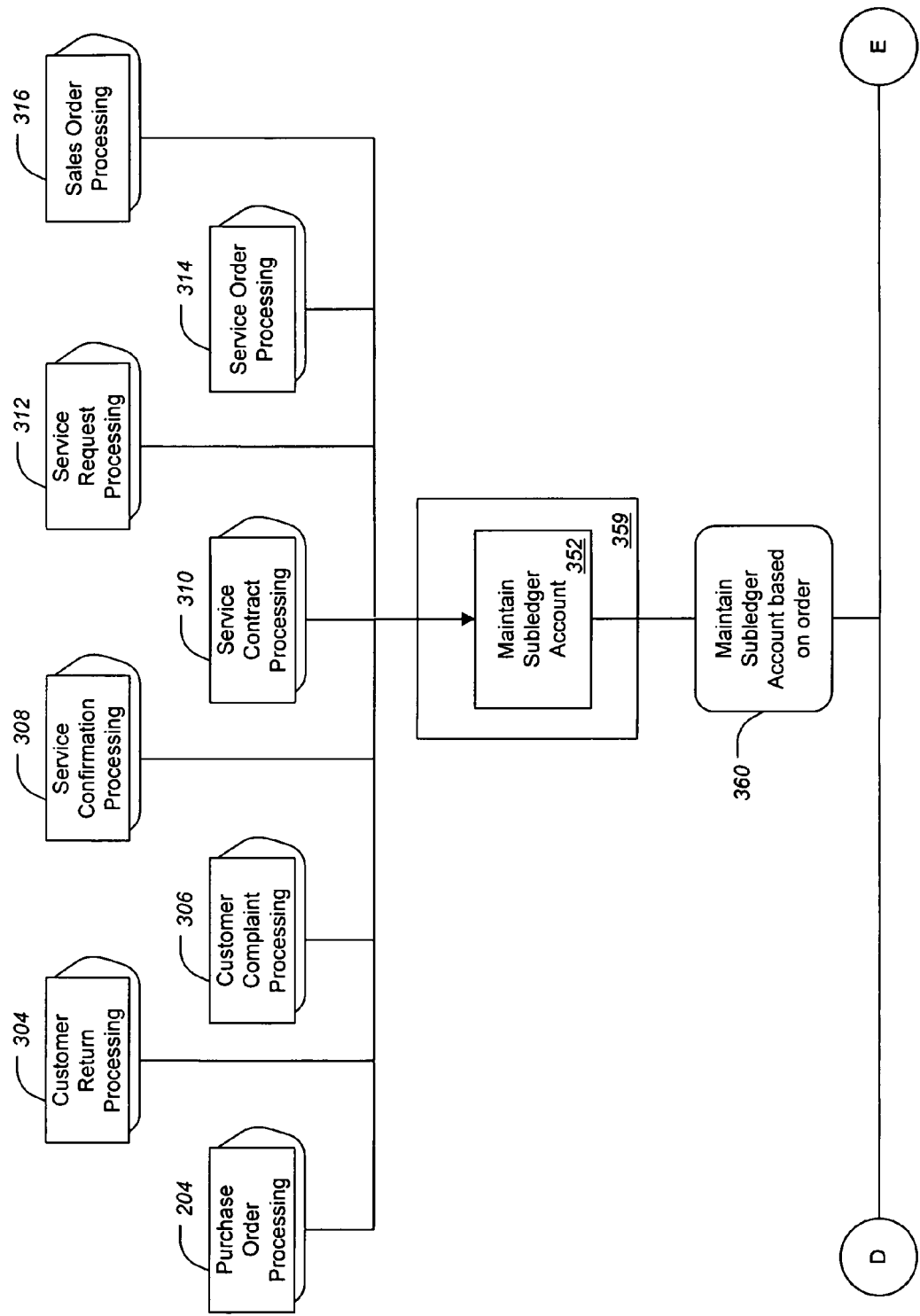

As shown in FIG. 3B, several process components may give input to the Maintain Subledger Account operation 352. These include the Purchase Order Processing process component 204, the Customer Return Processing process component 304, the Customer Complaint Processing process component 306, the Service Confirmation Processing process component 308, the Service Contract Processing process component 310, the Service Request Processing process component 312, the Service Order Processing process component 314, and the Sales Order Processing process component 316.

The operation 352 is included in an Order Accounting In interface 359 and uses a Maintain Subledger Account based on order asynchronous inbound process agent 360 to update the Accounting Notification business object 358.

As shown in FIG. 3C, the Project Processing process component 104 may give input to a Maintain Subledger Account operation 352 that receives order accounting notifications from process components. The notification is to inform accounting processing about the creation, change or deletion of any kind of order business objects. The operation 352 is included in a Project Accounting In interface 361 and uses a Maintain Accounting View On Project and Ledger Account asynchronous inbound process agent 362 to update the Accounting Notification business object 358.

A Goods and Service Accounting In interface 363 includes a Create Accounting Document operation 364 and a Cancel Accounting Document operation 365. The Create Accounting Document operation 364 can receive goods movement resource consumption notifications from the Goods and Service Acknowledgement process component 318. The Cancel Accounting Document operation 365 can receive goods movement resource consumption cancellation requests from the Goods and Service Acknowledgement process component 318. Both operations use a Maintain Accounting Document based on Goods and Service Acknowledgement asynchronous inbound process agent 366 to update the Accounting Notification business object 358.

An Inventory and Activity Accounting In interface 367 includes a Create Accounting Document operation 364 and a Cancel Accounting Document operation 365. The Create Accounting Document operation 364 receives inventory change accounting notifications from the Confirmation and Inventory process component 320, the Site Logistics Processing process component 322 or the Production process component 302. The Cancel Accounting Document operation 365 receives inventory change accounting cancellation requests from the Confirmation and Inventory process component 320, the Site Logistics Processing process component 322, or the Production process component 302. Both operations use a Maintain Accounting based on Inventory and Activity asynchronous inbound process agent 368 to update the Accounting Notification business object 358.

As shown in FIG. 3D, a Service Provision Accounting In interface 369 includes a Create Accounting Document operation 364 and a Cancel Accounting Document operation 365. The Create Accounting Document operation 364 receives resource consumption notifications from the Service Request Processing process component 312, the Service Confirmation Processing process component 308, or the Time and Labor Management process component 206. The Cancel Accounting Document operation 365 receives resource consumption cancellation requests from the Service Request Processing process component 312, the Service Confirmation Processing process component 308, or the Time and Labor Management process component 206. Both operations use a maintain Accounting Document based on Service Provision asynchronous inbound process agent 370 to update the Accounting Notification business object 358.

An Invoice Accounting In interface 371 includes a Create Accounting Document operation 364 and a Cancel Accounting Document operation 365. The Create Accounting Document operation 364 creates an accounting document for a customer invoice or a supplier invoice. The accounting document records payables, receivables, expenses and revenues for the Invoice in Financial Accounting. The Cancel Accounting Document operation 365 receives Invoice Accounting cancellation requests from the Customer Invoice Processing process component 324 or the Supplier Invoice Processing process component 326. Both operations use a Maintain Accounting Document based on Invoice asynchronous inbound process agent 372 to update the Accounting Notification business object 358.

Figure 3E:
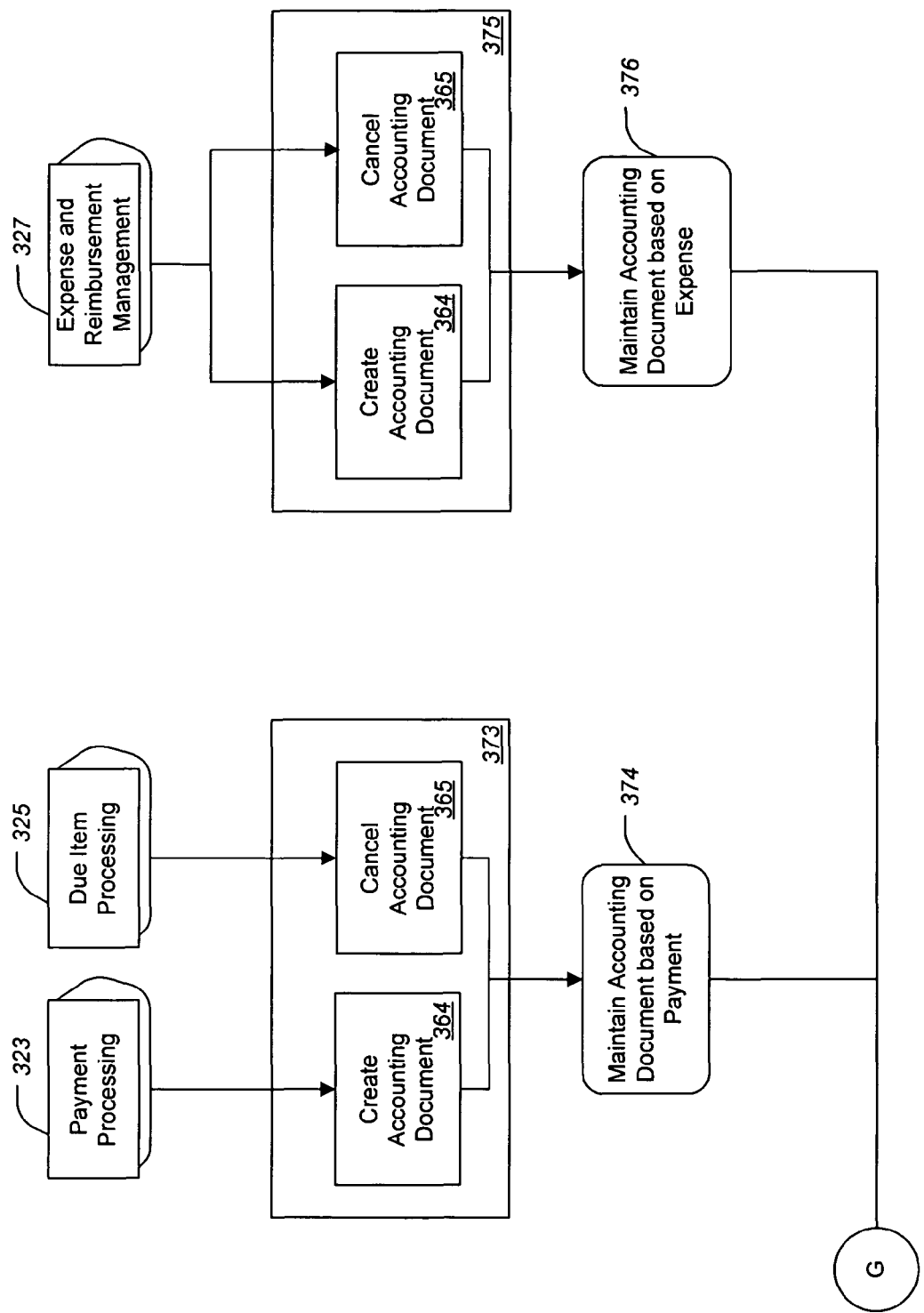

As shown in FIG. 3E, a Payment Accounting In interface 373 includes a Create Accounting Document operation 364 and a Cancel Accounting Document operation 365. The Create Accounting Document operation 364 receives payment accounting notifications from the Payment Processing process component 323 or the Due Item Processing process component 325. Both operations use a Maintain Accounting based on Payment asynchronous inbound process agent 374 to update the Accounting Notification business object 358.

An Expense Accounting In interface 375 includes a Create Accounting Document operation 364 and a Cancel Accounting Document operation 365. The Create Accounting Document operation 364 receives expense accounting notifications from the Expense and Reimbursement Processing process component 327. The Cancel Accounting Document operation 365 receives expense accounting cancellation requests from the Expense and Reimbursement Processing process component 327. Both operations use a Maintain Accounting based on Document Expense asynchronous inbound process agent 375 to update the Accounting Notification business object 358.

Figure 4:
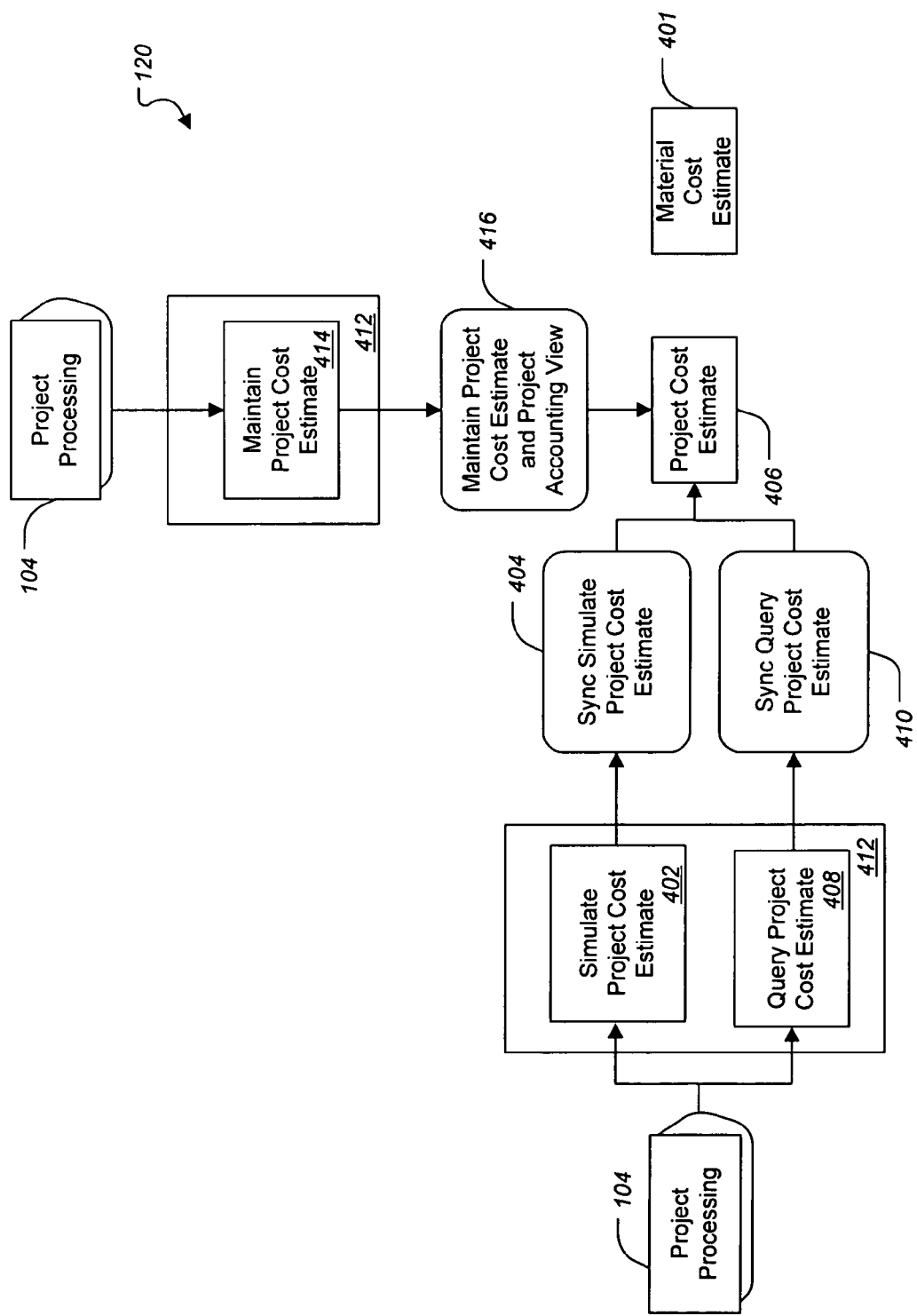
FIG. 4 is a block diagram of a costing process component.

FIG. 4 is a block diagram of the Costing process component 120. The Project Processing process component 104 is used to show exemplary input sources. A Material Cost Estimate business object 401 is included as part of the Financial Accounting deployment unit.

A Simulate Project Cost Estimate operation 402 can be invoked by the Project Processing process component 104. The Simulate Project Cost Estimate operation 402 occurs when costing document processing is requested to perform a synchronous project costing simulation and return the new calculated costing results. The estimate is sent using a Synchronous Simulate Project Cost Estimate message agent to update a Project Cost Estimate business object 406. A Query Project Cost Estimate operation 408 may also be invoked where a project cost estimate is requested and the operation is returning the costing results of a project. Both operations 404 and 408 are included in a Project Costing In interface 412.

The Project Processing process component 104 can also invoke a Maintain Project Cost Estimate operation 414 where costing document processing is informed about the creation or the change of project elements that are costing relevant, and carry out a new cost estimate for the project and creates a project accounting view, if required. The Maintain Project Cost Estimate operation 414 is included in the Project Costing In interface 412. A Maintain Project Costing asynchronous outbound process agent 416 updates the Project Cost Estimate business object 406.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product encoded on a tangible, non-transitory, machine-readable storage device for, providing message-based services using a service-oriented methodology, the medium comprising:
   program code for implementing a project management deployment unit including:
   a project request business object is used to simulate several alternative project setups;
      a project business object is characterized by a unique set of conditions and structured by phases and tasks;
      a project snapshot business object is a copy of the whole project at a certain point in time;
      a project simulation business object is used to find out about the effect of changes on an operational project;
      a project purchase request business object is used to monitor procurement documents; and
      a project template business object is used for standardizing a new project execution;
   wherein the project management deployment unit further includes instructions for executing service operations including:
      a change project based on purchase request confirmation operation operable to send a confirmation to a requester of the extent to which a requisition has been fulfilled;
      a change project based on purchase order operation operable to notify the project about the creation of a purchase order for an external resource;
      a change project based on employee time calendar operation operable to send a confirmation of working time for a project task;
      a check task availability for accounting operation operable to notify of task availability;
      a request service operation operable to request a buyer to procure external resources or services;
      a notify of project operation operable to inform accounting about a creation or change of project elements;
      a request project cost estimate operation operable to inform accounting about a creation or change of project elements that are costing relevant;
      a request project cost estimate simulation operation operable to request to perform a synchronous project costing simulation; and
      a query project cost estimate operation operable to query costing for the last costing result for project elements;
   program code for implementing a financial accounting deployment unit including an overhead cost sheet object including a set of rules for the calculation of overhead charges, a time based accrual business object including the specification for accrual methods, an overhead cost assessment rule business object used for the assessment of overhead cost to the proper originators, an accounting view on project business object representing the project structure in financials, a general ledger account distribution run business object including an automatic periodically-executed rule-based posting assistant, an overhead cost ledger account overhead cost calculation run business object including an automatic calculation run to calculate and post the overhead costs at period end, an overhead cost assessment run business object including an automatic rule-based calculation of collected amounts and quantities in overhead cost ledger accounts based on key figures or keys, an accounts receivable payable ledger account foreign currency re-measurement run business object including an automatic period-end re-measurement of foreign currency amounts, a work in process clearing run business object including an automatic clearing of work in process at period end, a sales ledger account business object including a view of sales activities defined for financial accounting purposes, a production ledger account overhead cost calculation run business object including an automatic calculation run to calculate and post the overhead costs at period end, a sales ledger account overhead cost calculation run business object including an automatic calculation run to calculate and post the overhead costs at period end, a fixed asset depreciation run business object including an automatic depreciation of asset values for a set of fixed assets, a balance carry forward run business object including an automatic carry forward of year end balances for all general ledger accounts and fixed assets to the following fiscal year, an inventory price change run business object including a change to the inventory price, an accounts receivable payable ledger account regrouping run business object including an automatic transfer posting of valuated receivables and payables for a set of accounts receivable payable ledger accounts, an accounting entry business object used to directly enter business transactions in financial accounting, an accounting document business object representing a business transaction in financial accounting, a goods receipt invoice receipt clearing run business object including an automatic calculation of price variances between the valuated goods received and the related invoice received at period end, an overhead cost distribution run business object including an automatic periodically-executed rule-based posting assistant, a general ledger account assessment run business object including an automatic rule-based calculation of collected amounts and quantities in general ledger accounts, an other direct cost ledger account including a record of debit and credit entries showing an effect of business transactions on costs as a result of a particular job or activity, an accounting notification business object including a common input channel for all kinds of operational business transactions into financial accounting, a sales ledger account accruals run business object including an automatic valuation of sales transactions for a set of sales ledger accounts at period end, an accounting adjustment run business object including an automatic valuation of a set of ledger accounts, an accounts receivable payable ledger account discounting run business object including an automatic discounting of valuated payables and receivables, a cash ledger account foreign currency re-measurement run business object including an automatic re-measurement of foreign currency amounts, a purchase ledger account business object including a view of purchasing activities defined for financial accounting purposes, a cash ledger account business object including a record of the valuated liquid assets of a company, a material ledger account business object including a record of materials assets in a company that are relevant to valuation, a production ledger account business object including a view of production related business transactions defined for financial accounting purposes, a chart of accounts business object used to chart account status, a general ledger account business object including a view of the value of assets, liabilities, equity, revenues and expenses for financial accounting purposes, an overhead cost ledger account business object including a record of the costs incurred by the provision of resources, a fixed asset business object including a view of one or more objects, rights, or other items owned by the enterprise that is intended for long-term use, a tax ledger account business object including a summary of tax liabilities defined for financial accounting purposes, an accounts receivable payable ledger account business object including a record of valuated payables and receivables of a company for a specific business partner, a project cost estimate business object including a listing of the elements of a project that incur costs, a service product valuation data business object representing internal prices for valuation of business transactions related to a service product or a service product group and for cost estimation, a material valuation data business object representing internal prices for the valuation of business transactions related to a material or a material group, for material inventory valuation and for cost estimation, a resource valuation data business object representing internal prices for the valuation of business transactions related to a material or a material group, for material inventory valuation and for cost estimation, an overhead cost scheme business object representing a set of rules for the calculation of overhead charges, a financial accounting view of project business object representing a financial accounting project and its structure, an overhead cost assessment rule business object specifying costs to be allocated and the assessment base to calculate charges, a general ledger account balance distribution run business object specifying balances accrued on profit and loss and balance sheet accounts to be distributed, a time based accrual business object representing an assignment of revenues or expenses relating to services provided over a period to the correct periods in terms of accepted accounting practice, and a material cost estimate business object including a listing of the elements involved in the procurement or production of a material that incur costs, wherein the financial accounting deployment unit further includes instructions for executing service operations including:

a create accounting entry operation operable to receive an accounting document from another instance of accounting;

a maintain subledger account operation operable to receive a project accounting notification from project processing;

a create accounting document operation operable to receive an expense accounting notification from expense and reimbursement processing;

a synchronous valuate product and resource operation operable to synchronize access to price information for products;

a maintain project cost estimate operation operable to inform costing document processing about the creation or change of project elements that are costing relevant;

a cancel accounting document operation operable to receive an expense accounting notification from expense and reimbursement processing; and a simulate project cost estimate operation operable to request performance of a synchronous project costing simulation and response;

wherein each of the said project management and financial accounting deployment units are deployable and executable.

2. A computer program product encoded on a tangible, non-transitory, machine-readable storage device for providing message-based services using a service-oriented methodology, the medium comprising:

a change project based on purchase request confirmation operation operable to send a confirmation to a requester of the extent to which a requisition has been fulfilled;

a change project based on purchase order operation operable to notify the project about the creation of a purchase order for an external resource;

a change project based on employee time calendar operation operable to send a confirmation of working time for a project task;

a check task availability for accounting operation operable to notify of task availability;

a request service operation operable to request a buyer to procure external resources or services;

a notify of project operation operable to inform accounting about a creation or change of project elements;

a request project cost estimate operation operable to inform accounting about a creation or change of project elements that are costing relevant;

a request project cost estimate simulation operation operable to request to perform a synchronous project costing simulation;

a query project cost estimate operation operable to query costing for the last costing result for project elements;

a create accounting entry operation operable to receive an accounting document from another instance of accounting;

a maintain subledger account operation operable to receive a project accounting notification from project processing;

a create accounting document operation operable to receive an expense accounting notification from expense and reimbursement processing;

a synchronous valuate product and resource operation operable to synchronize access to price information for products;

a maintain project cost estimate operation operable to inform costing document processing about the creation or change of project elements that are costing relevant;

a cancel accounting document operation operable to receive an expense accounting notification from expense and reimbursement processing; and a simulate project cost estimate operation operable to request performance of a synchronous project costing simulation and response;

wherein the computer software comprises:

a plurality of process components, each of the process components being a package of software deployed and executing on the computer system and implementing a respective and distinct business process, the plurality of process components including:

a project processing process component used to structure, plan and execute short-term measures and complex projects, the project processing process component including a project request business object that is used to simulate several alternative project setups, a project business object that is characterized by a unique set of conditions and structured by phases and tasks, a project snapshot business object that is a copy of the whole project at a certain point in time, a project simulation business object is used to find out about the effect of changes on an operational project, a project purchase request business object that is used to monitor procurement documents, and a project template business object that is used for standardizing a new project execution;

a costing process component including a material cost estimate business object that is a listing of the elements involved in the procurement or production of a material that incur costs, a project cost estimate business object that is a listing of the elements of a project that incur costs;

an accounting process component used to record all relevant business transactions in financial accounting, the accounting process component including an overhead cost sheet business object that is a set of rules for the calculation of overhead charges, a time based accrual business object that is the specification for accrual methods, an overhead cost assessment rule business object that is used for the assessment of overhead cost to the proper originators, an accounting view on project business object that represents the project structure in financials, a general ledger account distribution run business object that is an automatic, periodically executed, rule based posting assistant, an overhead cost ledger account overhead cost calculation run business object that is an automatic calculation run to calculate and post the overhead costs at period end, an overhead cost assessment run business object that is an automatic, rule based calculation of collected amounts and quantities in overhead cost ledger accounts based on key figures or keys, an accounts receivable payable ledger account foreign currency re-measurement run business object that is an automatic period-end re-measurement of foreign currency amounts, a work in process clearing run business object that is an automatic clearing of work in process at period end, a sales ledger account business object that is a view of sales activities defined for financial accounting purposes, a production ledger account overhead cost calculation run business object that is an automatic calculation run to calculate and post the overhead costs at period end, a sales ledger account overhead cost calculation run business object that is an automatic calculation run to calculate and post the overhead costs at period end, a fixed asset depreciation run business object that is an automatic depreciation of asset values for a set of fixed assets, a balance carry forward run business object that is the automatic carry forward of year end balances for all general ledger accounts and fixed assets to the following fiscal year, an inventory price change run business object that is a change to the inventory price, an accounts receivable payable ledger account regrouping run business object that is an automatic transfer posting of valuated receivables and payables for a set of accounts receivable payable ledger accounts, an accounting document business object that represents a business transaction in financial accounting, a goods receipt invoice receipt clearing run business object that is an automatic calculation of price variances between the valuated goods received and the related invoice received at period end, an overhead cost distribution run business object that is an automatic, periodically executed, rule based posting assistant, a general ledger account assessment run business object that is an automatic, rule based calculation of collected amounts and quantities in general ledger accounts, an other direct cost ledger account business object that is a record of debit and credit entries belonging to a company that shows the effect of business transactions on costs as a result of a particular job or activity, an accounting notification business object that is an common input channel for all kinds of operational business transactions into financial accounting, a sales ledger account accruals run business object that is an automatic valuation of sales transactions for a set of sales ledger accounts at period end, the accounting adjustment run, an accounting adjustment run business object that is an automatic valuation of, or an automatic value changing process for a set of ledger accounts, an accounts receivable payable ledger account discounting run business object that is an automatic discounting of valuated payables and receivables, a cash ledger account foreign currency re-measurement run business object that is an automatic re-measurement of foreign currency amounts, a purchase ledger account business object that is a view of purchasing activities defined for financial accounting purposes, a cash ledger account business object that is a record of the valuated liquid assets of a company, a material ledger account business object that is a record of the quantities, values, and prices for materials in a company that are relevant to valuation, a chart of accounts business object that is used to chart account status, a general ledger account business object that is a view of the value of assets, liabilities, equity, revenues and expenses for financial accounting purposes, an overhead cost ledger account business object that is a record of the costs incurred by the provision of resources, a fixed asset business object that is a view of one or more objects, rights, or other items owned by the enterprise that are intended for long-term use, a tax ledger account business object that is a summary of tax liabilities defined for financial accounting purposes, and an accounts receivable payable ledger account business object that is a record of valuated payables and receivables of a company for a specific business partner; and a financial accounting master data management process component used to enable a company to manage rules that are used by accounting and costing, the financial accounting master data management process component including a service product valuation data business object that represents internal prices for the valuation of business transactions related to a service product or a service product group and for cost estimation, a material valuation data business object that represents internal prices for the valuation of business transactions related to a material or a material group, for material inventory valuation and for cost estimation, a resource valuation data business object that represents attributes and internal cost rates for the valuation of business transactions related to a resource and for cost estimation, an overhead cost scheme business object that represents a set of rules for the calculation of overhead charges, a financial accounting view of project business object that represents a financial accounting project and its structure, an overhead cost assessment rule business object that specifies which costs are to be allocated, the receivers, and the assessment base to calculate the charges, a general ledger account balance distribution run business object that specifies which balances accrued on profit and loss or balance sheet accounts are to be distributed, and a time based accrual business object that represents an assignment of revenues or expenses relating to services provided over a period to the correct periods in terms of accepted accounting practice;

and wherein:

the project processing process component implements the change project based on purchase request confirmation, the change project based on purchase order, the change project based on employee time calendar, the check project task availability for accounting, the request service, the notify of project, the request project cost estimate, the request project cost estimate simulation, and the query project cost estimate service operations;

and the accounting process component implements the create accounting entry, the maintain subledger account, the create accounting document, the cancel accounting document, the simulate project cost estimate, and the query project cost estimate operation;

program code for implementing a project processing process component used to structure, plan and execute short-term measures and complex projects, the project processing process component including a project request business object that is used to simulate several alternative project setups, a project business object that is characterized by a unique set of conditions and structured by phases and tasks, a project snapshot business object that is a copy of the whole project at a certain point in time, a project simulation business object is used to find out about the effect of changes on an operational project, a project purchase request business object that is used to monitor procurement documents, and a project template business object that is used for standardizing a new project execution, wherein the project processing process component further includes instructions for executing service operations including;

a change project based on purchase request confirmation service operation operable to send a confirmation to a requester of the extent to which a requisition has been fulfilled;

a change project based on purchase order service operation operable to notify the project about the creation of a purchase order for an external resource;

a change project based on employee time calendar service operation operable to send a confirmation of working time for a project task;

a check task availability for accounting service operation operable to notify of task availability;

a request service operation operable to request a buyer to procure external resources or services:

a notify of project service operation operable to inform accounting about a creation or change of project elements;

a request project cost estimate service operation operable to inform accounting about a creation or change of project elements that are costing relevant;

a request project cost estimate simulation service operation operable to request to perform a synchronous project costing simulation; and a query project cost estimate operation service operable to query costing for the last costing result for project elements;

program code for implementing a costing process component including a material cost estimate business object that is a listing of the elements involved in the procurement or production of a material that incur costs, and a project cost estimate business object that is a listing of the elements of a project that incur costs;

program code for implementing an accounting process component used to record all relevant business transactions in financial accounting, the accounting process component including an overhead cost sheet business object that is a set of rules for the calculation of overhead charges, a time based accrual business object that is the specification for accrual methods, an overhead cost assessment rule business object that is used for the assessment of overhead cost to the proper originators, an accounting view on project business object that represents the project structure in financials, a general ledger account distribution run business object that is an automatic, periodically executed, rule based posting assistant, an overhead cost ledger account overhead cost calculation run business object that is an automatic calculation run to calculate and post the overhead costs at period end, an overhead cost assessment run business object that is an automatic, rule based calculation of collected amounts and quantities in overhead cost ledger accounts based on key figures or keys, an accounts receivable payable ledger account foreign currency re-measurement run business object that is an automatic period-end re-measurement of foreign currency amounts, a work in process clearing run business object that is an automatic clearing of work in process at period end, a sales ledger account business object that is a view of sales activities defined for financial accounting purposes, a production ledger account overhead cost calculation run business object that is an automatic calculation run to calculate and post the overhead costs at period end, a sales ledger account overhead cost calculation run business object that is an automatic calculation run to calculate and post the overhead costs at period end, a fixed asset depreciation run business object that is an automatic depreciation of asset values for a set of fixed assets, a balance carry forward run business object that is the automatic carry forward of year end balances for all general ledger accounts and fixed assets to the following fiscal year, an inventory price change run business object that is a change to the inventory price, an accounts receivable payable ledger account regrouping run business object that is an automatic transfer posting of valuated receivables and payables for a set of accounts receivable payable ledger accounts, an accounting document business object that represents a business transaction in financial accounting, a goods receipt invoice receipt clearing run business object that is an automatic calculation of price variances between the valuated goods received and the related invoice received at period end, an overhead cost distribution run business object that is an automatic, periodically executed, rule based posting assistant, a general ledger account assessment run business object that is an automatic, rule based calculation of collected amounts and quantities in general ledger accounts, an other direct cost ledger account business object that is a record of debit and credit entries belonging to a company that shows the effect of business transactions on costs as a result of a particular job or activity, an accounting notification business object that is an common input channel for all kinds of operational business transactions into financial accounting, a sales ledger account accruals run business object that is an automatic valuation of sales transactions for a set of sales ledger accounts at period end, the accounting adjustment run, an accounting adjustment run business object that is an automatic valuation of, or an automatic value changing process for a set of ledger accounts, an accounts receivable payable ledger account discounting run business object that is an automatic discounting of valuated payables and receivables, a cash ledger account foreign currency re-measurement run business object that is an automatic re-measurement of foreign currency amounts, a purchase ledger account business object that is a view of purchasing activities defined for financial accounting purposes, a cash ledger account business object that is a record of the valuated liquid assets of a company, a material ledger account business object that is a record of the quantities, values, and prices for materials in a company that are relevant to valuation, a chart of accounts business object that is used to chart account status, a general ledger account business object that is a view of the value of assets, liabilities, equity, revenues and expenses for financial accounting purposes, an overhead cost ledger account business object that is a record of the costs incurred by the provision of resources, a fixed asset business object that is a view of one or more objects, rights, or other items owned by the enterprise that are intended for long-term use, a tax ledger account business object that is a summary of tax liabilities defined for financial accounting purposes, and an accounts receivable payable ledger account business object that is a record of valuated payables and receivables of a company for a specific business partner, wherein the accounting process component further includes instructions for executing service operations including:
  a create accounting entry service operation operable to receive an accounting document from another instance of accounting;
  a maintain subledger account service operation operable to receive a project accounting notification from project processing;
  a create accounting document service operation operable to receive an expense accounting notification from expense and reimbursement processing;
  a cancel accounting document service operation operable to receive an expense accounting notification from expense and reimbursement processing; and
  a simulate project cost estimate service operation operable to request performance of a synchronous project costing simulation and response; and program code for implementing a financial accounting master data management process component used to enable a company to manage rules that are used by accounting and costing, the financial accounting master data management process component including a service product valuation data business object that represents internal prices for the valuation of business transactions related to a service product or a service product group and for cost estimation, a material valuation data business object that represents internal prices for the valuation of business transactions related to a material or a material group, for material inventory valuation and for cost estimation, a resource valuation data business object that represents attributes and internal cost rates for the valuation of business transactions related to a resource and for cost estimation, an overhead cost scheme business object that represents a set of rules for the calculation of overhead charges, a financial accounting view of project business object that represents a financial accounting project and its structure, an overhead cost assessment rule business object that specifies which costs are to be allocated, the receivers, and the assessment base to calculate the charges, a general ledger account balance distribution run business object that specifies which balances accrued on profit and loss or balance sheet accounts are to be distributed, and a time based accrual business object that represents an assignment of revenues or expenses relating to services provided over a period to the correct periods in terms of accepted accounting practice;

wherein each of the process components are deployable and executable on a computer system.

* * * * *